(12) United States Patent
Shiraishi

(10) Patent No.: US 9,767,347 B2
(45) Date of Patent: Sep. 19, 2017

(54) ANALYSIS PROCESSING SYSTEM

(71) Applicant: NEC Corporation, Tokyo (JP)

(72) Inventor: Nobuhisa Shiraishi, Tokyo (JP)

(73) Assignee: NEC Corporation, Tokyo (JP)

( * ) Notice: Subject to any disclaimer, the term of this patent is extended or adjusted under 35 U.S.C. 154(b) by 70 days.

(21) Appl. No.: 14/765,584

(22) PCT Filed: Jan. 15, 2014

(86) PCT No.: PCT/JP2014/000144
§ 371 (c)(1),
(2) Date: Aug. 4, 2015

(87) PCT Pub. No.: WO2014/122879
PCT Pub. Date: Aug. 14, 2014

(65) Prior Publication Data
US 2015/0371078 A1    Dec. 24, 2015

(30) Foreign Application Priority Data
Feb. 5, 2013  (JP) .................................. 2013-020404

(51) Int. Cl.
*G06K 9/00* (2006.01)
*G06T 7/246* (2017.01)

(52) U.S. Cl.
CPC ..... *G06K 9/00228* (2013.01); *G06K 9/00771* (2013.01); *G06T 7/246* (2017.01);
(Continued)

(58) Field of Classification Search
CPC ........... G06T 2207/10016; G06T 2207/30168; G06T 7/0081; G06T 7/2093; G06T 7/2033; G06K 9/00228; G06K 9/00771
See application file for complete search history.

(56) References Cited

U.S. PATENT DOCUMENTS

2001/0019357 A1*  9/2001  Ito .................... G08B 13/19604
                                                   348/152
2007/0230943 A1* 10/2007  Chang .................... G03B 37/00
                                                   396/322
(Continued)

FOREIGN PATENT DOCUMENTS

JP      2006-211696      8/2006
JP      2011-70576       4/2011
(Continued)

OTHER PUBLICATIONS

Frederick W. Wheeler, Richard L. Weiss and Peter H. Tu; Face Recognition at a Distance System for Surveillance Applications; IEEE, 2010.*

(Continued)

*Primary Examiner* — Stephen R Koziol
*Assistant Examiner* — Shaghayegh Azima
(74) *Attorney, Agent, or Firm* — Finnegan, Henderson, Farabow, Garrett & Dunner, L.L.P.

(57) ABSTRACT

An analysis processing system 100 includes: an object detection unit 101 which acquires an image taken with a camera 110, detects an object having a preset feature in the acquired image, and sets a predetermined range with reference to a position where the object is detected in the image, as an object region; and a new object region specification unit 102 which, on the basis of information of the object region, specifies the object region including an object newly appearing in a newly acquired image as a new object region, and sets a priority degree representing the degree of priority of execution of predetermined analysis processing on the new object region so as to be higher than the priority degree of the other object region.

17 Claims, 22 Drawing Sheets

(52) U.S. Cl.
CPC ............... *G06T 2207/10016* (2013.01); *G06T 2207/30201* (2013.01)

(56) References Cited

U.S. PATENT DOCUMENTS

| | | | | |
|---|---|---|---|---|
| 2008/0112606 | A1* | 5/2008 | Lee | G06K 9/0014 382/133 |
| 2009/0324020 | A1* | 12/2009 | Hasebe | G06K 9/00228 382/115 |
| 2010/0007763 | A1* | 1/2010 | Yokohata | H04N 5/23212 348/222.1 |
| 2010/0150450 | A1* | 6/2010 | Tsuji | H04N 5/232 382/195 |
| 2010/0302595 | A1* | 12/2010 | Yamada | G06K 9/4642 358/1.18 |
| 2011/0026766 | A1* | 2/2011 | Eshima | G06K 9/00744 382/103 |
| 2011/0092284 | A1* | 4/2011 | Kando | A63F 13/10 463/31 |
| 2011/0317928 | A1* | 12/2011 | Yabu | G06K 9/00677 382/225 |
| 2012/0121129 | A1* | 5/2012 | Okamoto | H04N 5/23212 382/103 |
| 2012/0155707 | A1 | 6/2012 | Kawano | |
| 2012/0157160 | A1* | 6/2012 | Ozcan | G01N 21/6458 455/556.1 |
| 2013/0050502 | A1* | 2/2013 | Saito | G06T 7/20 348/169 |
| 2013/0343604 | A1* | 12/2013 | Adachi | G06K 9/00711 382/103 |

FOREIGN PATENT DOCUMENTS

| | | |
|---|---|---|
| JP | 2012-128693 | 7/2012 |
| WO | WO 2008/099816 A1 | 8/2008 |

OTHER PUBLICATIONS

International Search Report mailed Apr. 1, 2014 in corresponding PCT International Application.

* cited by examiner

Fig.2
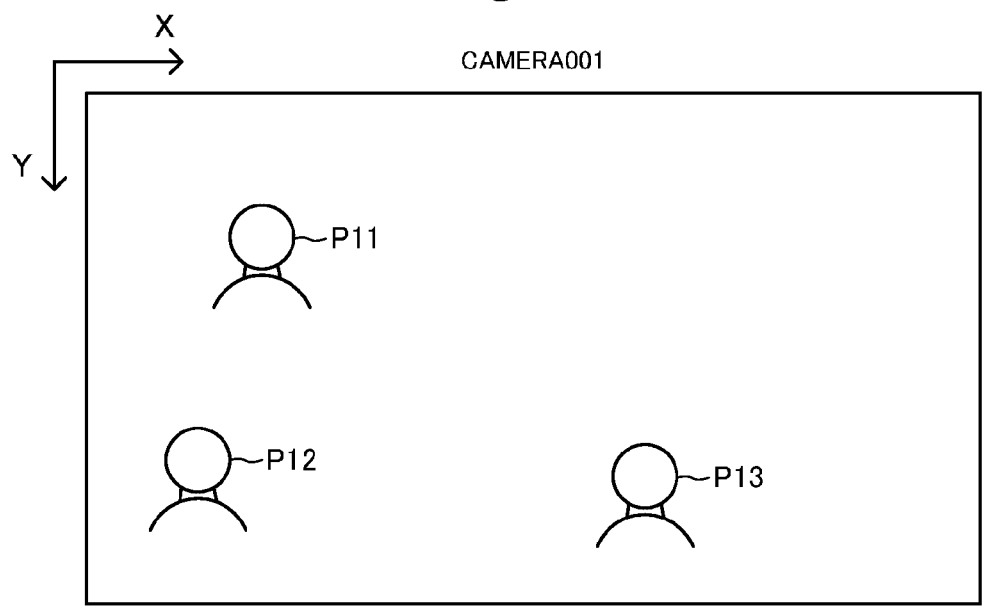
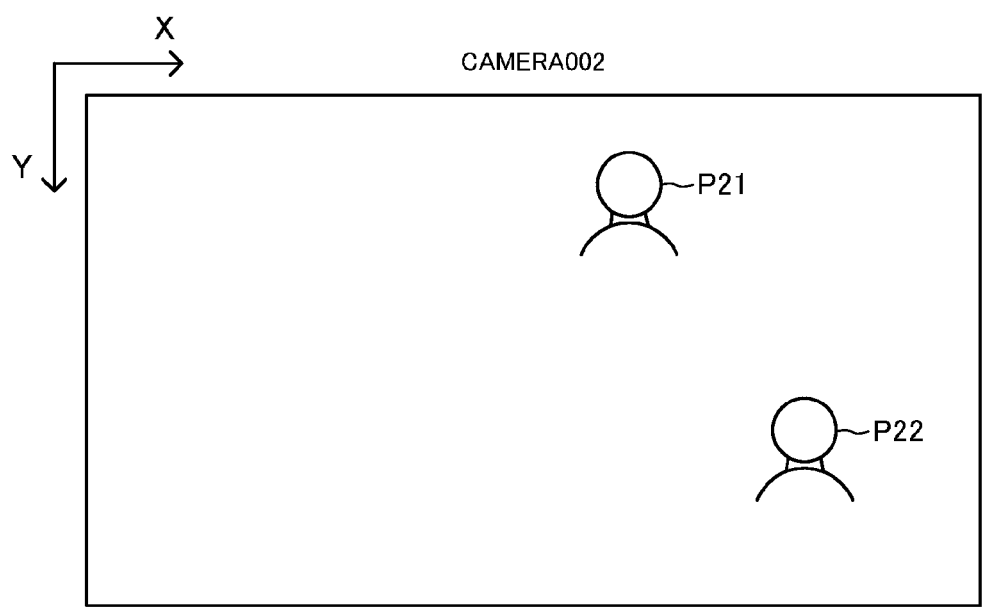

Fig.3
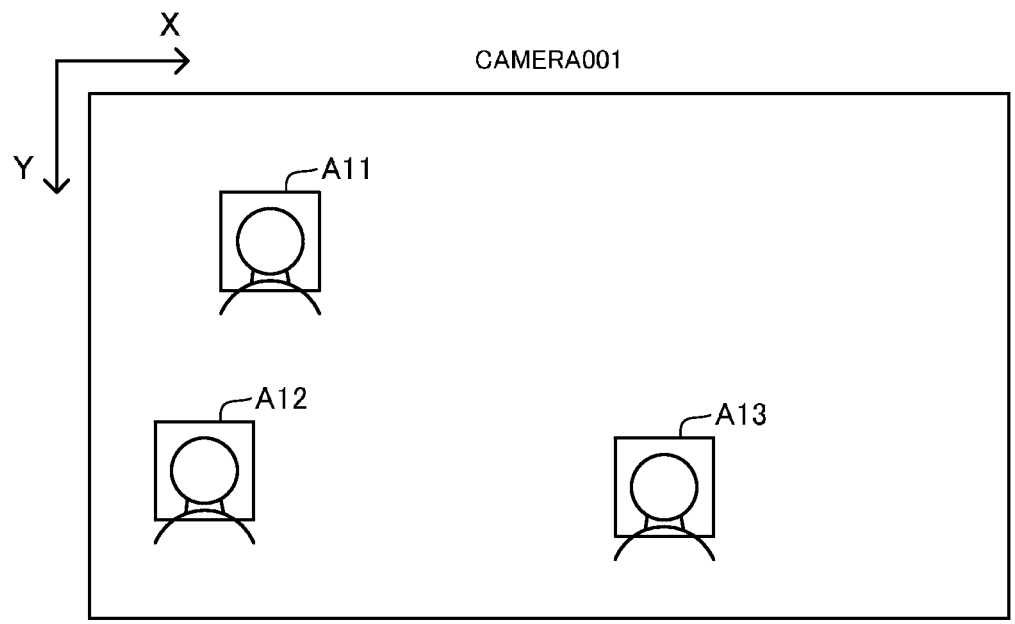
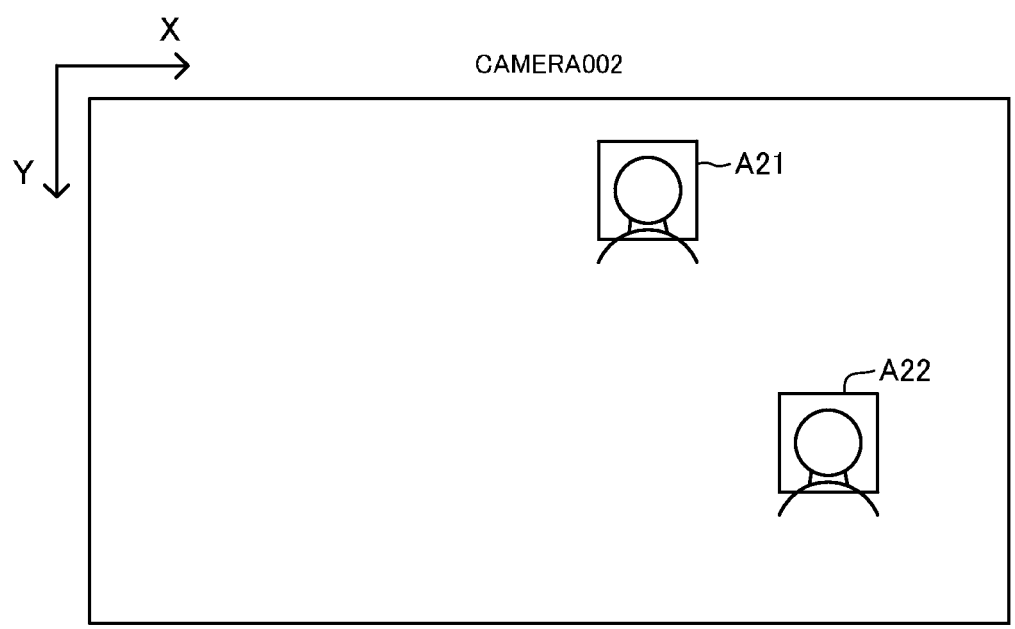

Fig.4

| CAMERA ID | FRAME TIME | X-COORDINATE MINIMUM VALUE | X-COORDINATE MAXIMUM VALUE | Y-COORDINATE MINIMUM VALUE | Y-COORDINATE MAXIMUM VALUE |
|---|---|---|---|---|---|
| CAMERA001 | 2011/12/19 12:01:00.100 | 120 | 170 | 150 | 250 |
| CAMERA001 | 2011/12/19 12:01:00.100 | 400 | 500 | 100 | 300 |
| CAMERA002 | 2011/12/19 12:01:00.100 | 100 | 200 | 100 | 200 |
| CAMERA003 | 2011/12/19 12:00:55.800 | 100 | 300 | 100 | 300 |
| CAMERA001 | 2011/12/19 12:00:55.900 | 400 | 500 | 100 | 300 |
| CAMERA004 | 2011/12/19 12:01:00.100 | 100 | 300 | 100 | 300 |
| CAMERA005 | 2011/12/19 12:01:00.100 | 100 | 300 | 100 | 300 |
| ... | ... | ... | ... | ... | ... |

Fig.5
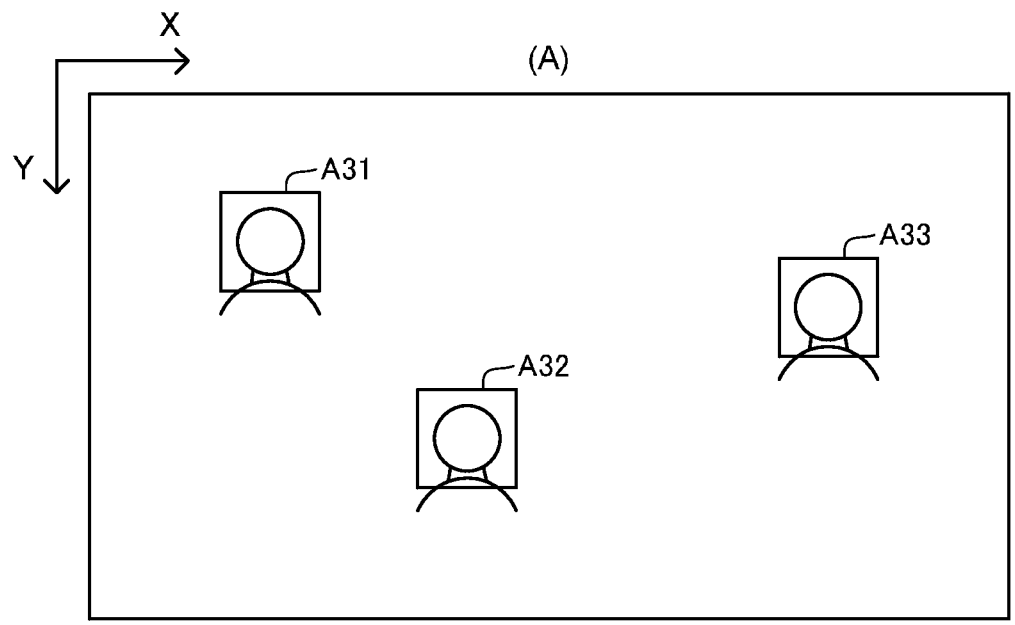
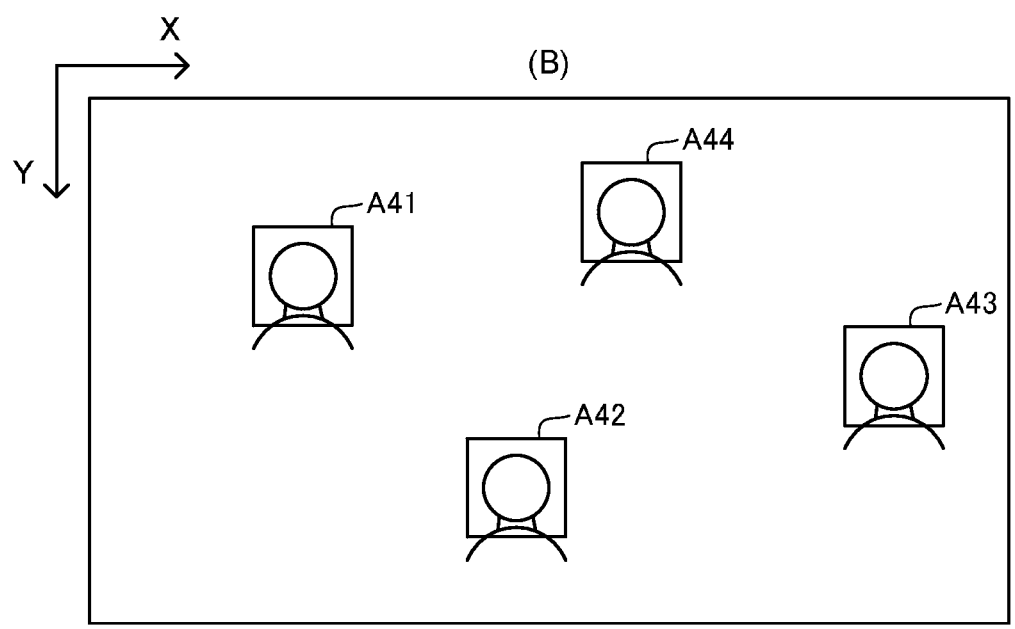

Fig.6
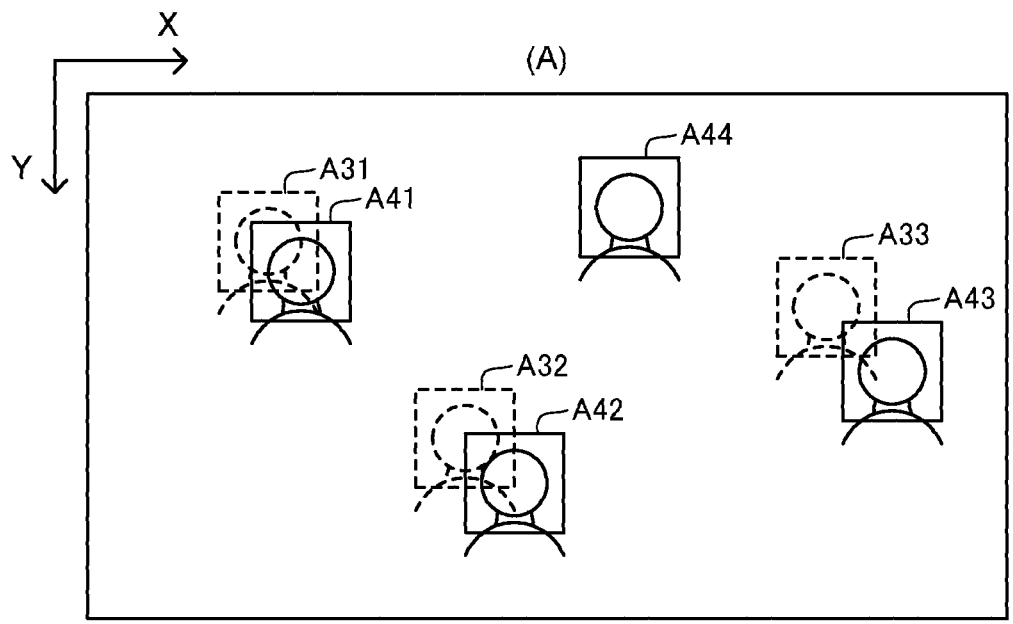
(A)
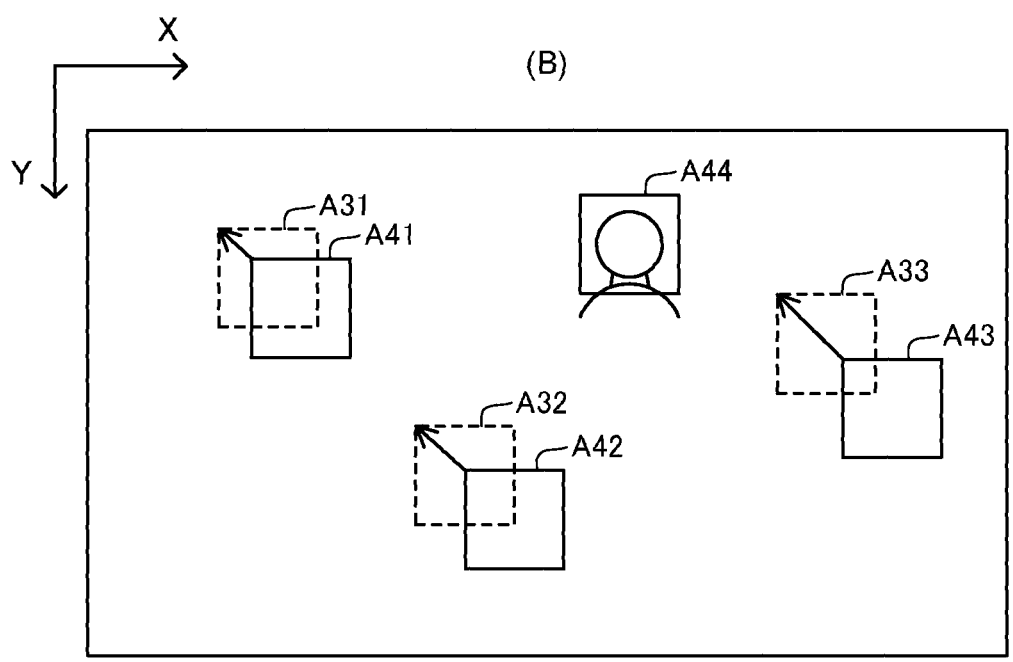
(B)

Fig.7

| TASK ID | FRAME TIME | PRIORITY DEGREE | PERSON JUDGMENT ID | ANALYSIS DATA |
|---|---|---|---|---|
| 000001 | 2011/12/19 12:00:11.100 | 0.00 | 10001 | ANALYSIS DATA (BINARY) |
| 000002 | 2011/12/19 12:00:11.100 | 0.00 | 10002 | ANALYSIS DATA (BINARY) |
| 000003 | 2011/12/19 12:00:11.100 | 0.00 | 10003 | ANALYSIS DATA (BINARY) |
| 000004 | 2011/12/19 12:00:11.100 | 0.10 | 10004 | ANALYSIS DATA (BINARY) |
| ... | ... | ... | ... | ... |

Fig.8

| TASK ID | FRAME TIME | PRIORITY DEGREE | ANALYSIS ENGINE | ANALYSIS DATA |
|---|---|---|---|---|
| 000004 | 2011/12/19 12:00:11.100 | 0.10 | FACE FEATURE ANALYSIS ENGINE | ANALYSIS DATA (BINARY) |
| 000001 | 2011/12/19 12:00:11.100 | 0.00 | FACE FEATURE ANALYSIS ENGINE | ANALYSIS DATA (BINARY) |
| 000002 | 2011/12/19 12:00:11.100 | 0.00 | FACE FEATURE ANALYSIS ENGINE | ANALYSIS DATA (BINARY) |
| 000003 | 2011/12/19 12:00:11.100 | 0.00 | FACE FEATURE ANALYSIS ENGINE | ANALYSIS DATA (BINARY) |
| ... | ... | ... | ... | ... |

Fig.9
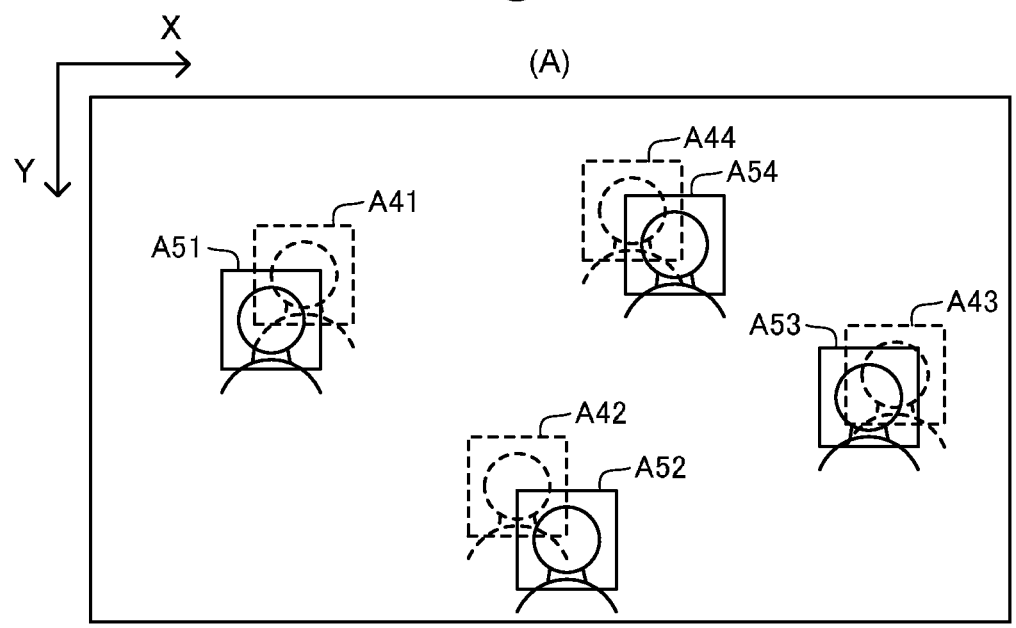
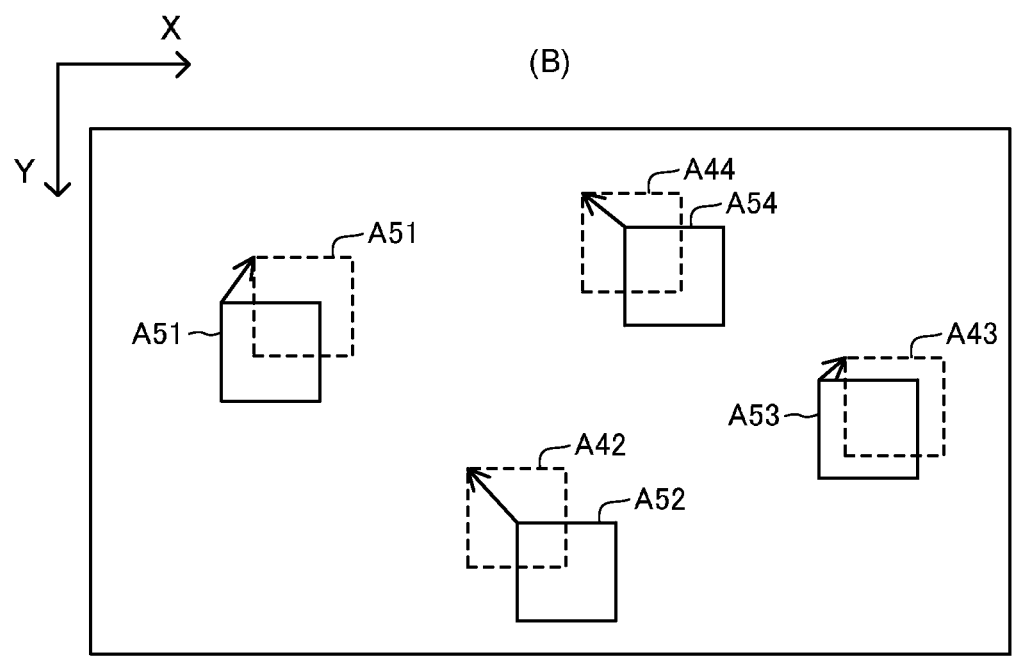

Fig.10

| TASK ID | FRAME TIME | PRIORITY DEGREE | PERSON JUDGMENT ID | ANALYSIS DATA |
|---|---|---|---|---|
| 000011 | 2011/12/19 12:00:22.200 | 0.00 | 10001 | ANALYSIS DATA (BINARY) |
| 000012 | 2011/12/19 12:00:22.200 | 0.00 | 10002 | ANALYSIS DATA (BINARY) |
| 000013 | 2011/12/19 12:00:22.200 | 0.00 | 10003 | ANALYSIS DATA (BINARY) |
| 000014 | 2011/12/19 12:00:22.200 | 0.00 | 10004 | ANALYSIS DATA (BINARY) |
| ... | ... | ... | ... | ... |

Fig.11

| TASK ID | FRAME TIME | PRIORITY DEGREE | ANALYSIS ENGINE | ANALYSIS DATA |
|---|---|---|---|---|
| 000011 | 2011/12/19 12:00:22.200 | 0.00 | FACE FEATURE ANALYSIS ENGINE | ANALYSIS DATA (BINARY) |
| 000012 | 2011/12/19 12:00:22.200 | 0.00 | FACE FEATURE ANALYSIS ENGINE | ANALYSIS DATA (BINARY) |
| 000013 | 2011/12/19 12:00:22.200 | 0.00 | FACE FEATURE ANALYSIS ENGINE | ANALYSIS DATA (BINARY) |
| 000014 | 2011/12/19 12:00:22.200 | 0.00 | FACE FEATURE ANALYSIS ENGINE | ANALYSIS DATA (BINARY) |
| ... | ... | ... | ... | ... |

Fig.12
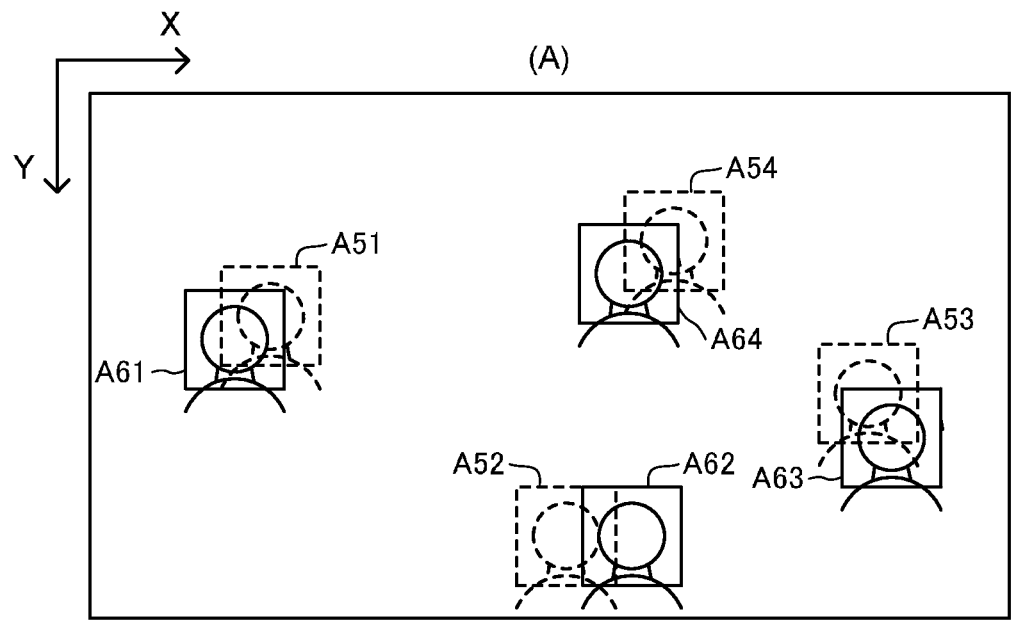
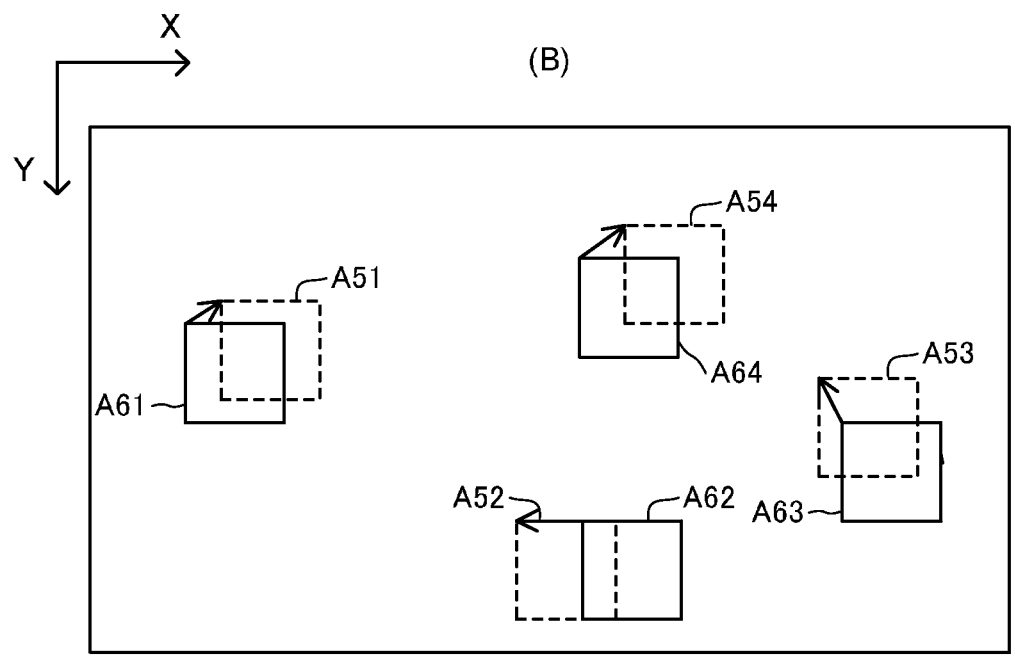

Fig.13

| TASK ID | FRAME TIME | PRIORITY DEGREE | PERSON JUDGMENT ID | ANALYSIS DATA |
|---|---|---|---|---|
| 000021 | 2011/12/19 12:00:33.300 | 0.00 | 10001 | ANALYSIS DATA (BINARY) |
| 000022 | 2011/12/19 12:00:33.300 | 0.00 | 10002 | ANALYSIS DATA (BINARY) |
| 000023 | 2011/12/19 12:00:33.300 | 0.00 | 10003 | ANALYSIS DATA (BINARY) |
| 000024 | 2011/12/19 12:00:33.300 | 0.00 | 10004 | ANALYSIS DATA (BINARY) |
| ... | ... | ... | ... | ... |

Fig.14

| TASK ID | FRAME TIME | PRIORITY DEGREE | PERSON JUDGMENT ID | ANALYSIS DATA |
|---|---|---|---|---|
| 000021 | 2011/12/19 12:00:33.300 | 0.00 | 10001 | ANALYSIS DATA (BINARY) |
| 000022 | 2011/12/19 12:00:33.300 | 0.00 | 10002 | ANALYSIS DATA (BINARY) |
| 000023 | 2011/12/19 12:00:33.300 | 0.00 | 10003 | ANALYSIS DATA (BINARY) |
| 000024 | 2011/12/19 12:00:33.300 | 0.10 | 10004 | ANALYSIS DATA (BINARY) |
| ... | ... | ... | ... | ... |

Fig.15

| TASK ID | FRAME TIME | PRIORITY DEGREE | ANALYSIS ENGINE | ANALYSIS DATA |
|---|---|---|---|---|
| 000024 | 2011/12/19 12:00:33.300 | 0.10 | FACE FEATURE ANALYSIS ENGINE | ANALYSIS DATA (BINARY) |
| 000021 | 2011/12/19 12:00:33.300 | 0.00 | FACE FEATURE ANALYSIS ENGINE | ANALYSIS DATA (BINARY) |
| 000022 | 2011/12/19 12:00:33.300 | 0.00 | FACE FEATURE ANALYSIS ENGINE | ANALYSIS DATA (BINARY) |
| 000023 | 2011/12/19 12:00:33.300 | 0.00 | FACE FEATURE ANALYSIS ENGINE | ANALYSIS DATA (BINARY) |
| ... | ... | ... | ... | ... |

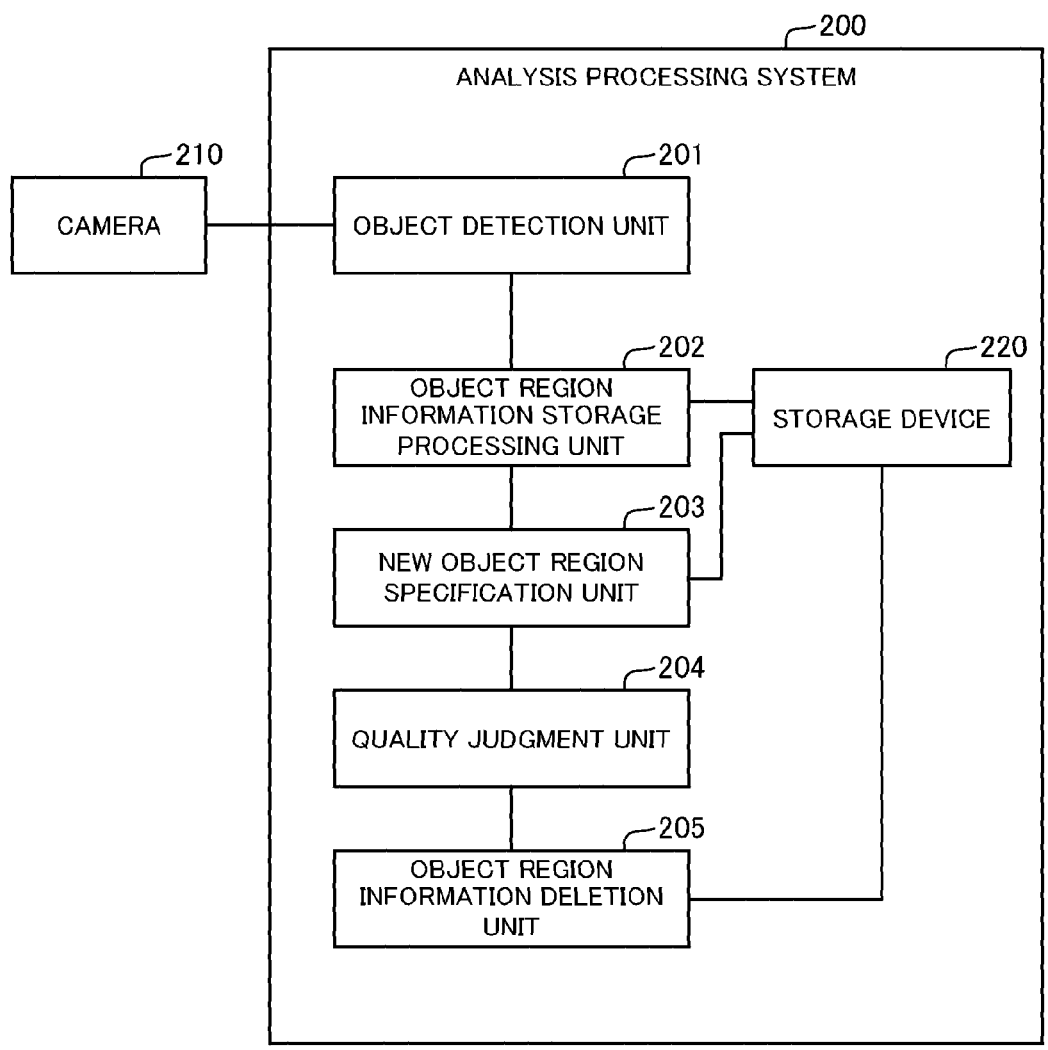

ANALYSIS PROCESSING SYSTEM

CROSS-REFERENCE TO RELATED PATENT APPLICATIONS

This application is a National Stage Entry of International Application No. PCT/JP2014/000144, filed Jan. 15, 2014, which claims priority from Japanese Patent Application No. 2013-020404, filed Feb. 5, 2013. The entire contents of the above-referenced applications are expressly incorporated herein by reference.

TECHNICAL FIELD

The present invention relates to an analysis processing system. In particular, the present invention relates to an analysis processing system which analyzes an image taken with a camera.

BACKGROUND ART

In recent years, with development of information processing technology, analysis systems which analyze various data have been developed. For example, one analysis system analyzes an image taken with a monitoring camera and detects the presence of a specific person or object registered in advance. Such an analysis system is required to detect the presence of a specific person or the like within a predetermined time after an image is taken with a monitoring camera. Therefore, execution of high-speed analysis processing is desired.

On the other hand, in a case where a number of monitoring cameras are installed and a number of persons and objects are simultaneously seen in a number of images taken with the monitoring cameras, processing for detecting a specific person or object is much and the analysis processing device is flooded with processing requests. Thus, there arises a problem that high-speed processing by an analysis processing device cannot be realized and it takes much time to detect a specific person or object. Even if only one monitoring camera is installed, in a case where a number of persons and objects are simultaneously seen in an image, it also takes much time to detect a specific person or object.

Patent Document 1 describes a technique for detecting a specific person from an image taken with a monitoring camera. To be specific, in the technique described in Patent Document 1, on the basis of the position of a face image detected in an input image inputted from a camera, the degree of priority is set for each input image. For example, Patent Document 1 describes that, for an image in which a face region is near the side end of the image, a high degree of priority of analysis processing on the image is set.
Patent Document 1: Japanese Unexamined Patent Application Publication No. JP-A 2011-070576

In the abovementioned technique described in Patent Document 1, the priority of degree of analysis processing is set "for each input image" on the basis of conditions such as the position of a face image detected in an input image. Consequently, an input image for which a high degree of priority is set is preferentially processed. Because analysis processing is executed on the whole input image, analysis processing on an unnecessary image region may also be executed. Then, as a consequence, there arises a problem that the result of analysis on a desired region cannot be quickly acquired.

SUMMARY

Accordingly, an object of the present invention is to solve the problem that in an analysis processing system, computer program and analysis processing method for executing image processing, the result of analysis on a desired region cannot be quickly acquired.

An analysis processing system as an aspect of the present invention includes:

an object detection unit which acquires an image taken with a camera, detects an object having a preset feature in the acquired image, and sets a predetermined range as an object region, the predetermined range being a range with reference to a position where the object is detected in the image; and a new object region specification unit which, on a basis of information of the object region, specifies the object region including an object newly appearing in a newly acquired image as a new object region, and sets a priority degree representing a degree of priority of execution of predetermined analysis processing on the new object region so as to be higher than the priority degree of the other object region.

Further, an analysis processing system as another aspect of the present invention includes:

an object detection unit which acquires an image taken with a camera, detects an object having a preset feature in the acquired image, and sets a predetermined range as an object region, the predetermined range being a range with reference to a position where the object is detected in the image;

an object region information storage processing unit which stores information of the object region into a storage device; and a new object region specification unit which, on a basis of information of the object region stored in the storage device in a previously acquired image and information of the object region set by the object detection unit in a newly acquired image, specifies, as a new object region, the object region including an object newly appearing in the newly acquired image as compared with the previously acquired image, and sets a priority degree representing a degree of priority of execution of predetermined analysis processing on the new object region so as to be higher than the priority degree of the other object region.

Further, a computer program as another aspect of the present invention includes instructions for causing an information processing device to realize:

an object detection unit which acquires an image taken with a camera, detects an object having a preset feature in the acquired image, and sets a predetermined range as an object region, the predetermined range being a range with reference to a position where the object is detected in the image; and a new object region specification unit which, on a basis of information of the object region, specifies the object region including an object newly appearing in a newly acquired image as a new object region, and sets a priority degree representing a degree of priority of execution of predetermined analysis processing on the new object region so as to be higher than the priority degree of the other object region.

Further, a computer program as another aspect of the present invention includes instructions for causing an information processing device to realize:

an object detection unit which acquires an image taken with a camera, detects an object having a preset feature in the acquired image, and sets a predetermined range as an object region, the predetermined range being a range with reference to a position where the object is detected in the image;

an object region information storage processing unit which stores information of the object region into a storage device; and a new object region specification unit which, on a basis of information of the object region stored in the storage device in a previously acquired image and information of the object region set by the object detection unit in a newly acquired image, specifies, as a new object region, the object region including an object newly appearing in the newly acquired image as compared with the previously acquired image, and sets a priority degree representing a degree of priority of execution of predetermined analysis processing on the new object region so as to be higher than the priority degree of the other object region.

Further, an analysis processing method as another aspect of the present invention includes:

acquiring an image taken with a camera, detecting an object having a preset feature in the acquired image, and setting a predetermined range as an object region, the predetermined range being a range with reference to a position where the object is detected in the image; and on a basis of information of the object region, specifying the object region including an object newly appearing in a newly acquired image as a new object region, and setting a priority degree representing a degree of priority of execution of predetermined analysis processing on the new object region so as to be higher than the priority degree of the other object region.

Further, an analysis processing method as another aspect of the present invention includes:

acquiring an image taken with a camera, detecting an object having a preset feature in the acquired image, and setting a predetermined range as an object region, the predetermined range being a range with reference to a position where the object is detected in the image;

storing information of the object region into a storage device; and on a basis of information of the object region stored in the storage device in a previously acquired image and information of the set object region in a newly acquired image, specifying, as a new object region, the object region including an object newly appearing in the newly acquired image as compared with the previously acquired image, and setting a priority degree representing a degree of priority of execution of predetermined analysis processing on the new object region so as to be higher than the priority degree of the other object region.

With the configurations as described above, the present invention can provide an analysis processing system, a computer program and an analysis processing method which can achieve increase of the speed of analysis processing on an image.

BRIEF DESCRIPTION OF DRAWINGS

FIG. 2 is a view showing an example of image processing by the video analysis system disclosed in FIG. 1;

FIG. 3 is a view showing an example of image processing by the video analysis system disclosed in FIG. 1;

FIG. 4 is a view showing an example of data stored in the video analysis system disclosed in FIG. 1;

FIG. 5 is a view showing an example of image processing by the video analysis system disclosed in FIG. 1;

FIG. 6 is a view showing an example of image processing by the video analysis system disclosed in FIG. 1;

FIG. 7 is a view showing an example of data stored in the video analysis system disclosed in FIG. 1;

FIG. 8 is a view showing an example of data stored in the video analysis system disclosed in FIG. 1;

FIG. 9 is a view showing an example of image processing by the video analysis system disclosed in FIG. 1;

FIG. 10 is a view showing an example of data stored in the video analysis system disclosed in FIG. 1;

FIG. 11 is a view showing an example of data stored in the video analysis system disclosed in FIG. 1;

FIG. 12 is a view showing an example of image processing by the video analysis system disclosed in FIG. 1;

FIG. 13 is a view showing an example of data stored in the video analysis system disclosed in FIG. 1;

FIG. 14 is a view showing an example of data stored in the video analysis system disclosed in FIG. 1;

FIG. 15 is a view showing an example of data stored in the video analysis system disclosed in FIG. 1;

FIG. 26 is a block diagram showing the configuration of an analysis processing system in Supplementary Note 22 of the present invention.

EXEMPLARY EMBODIMENTS

First Exemplary Embodiment

Figure 1:
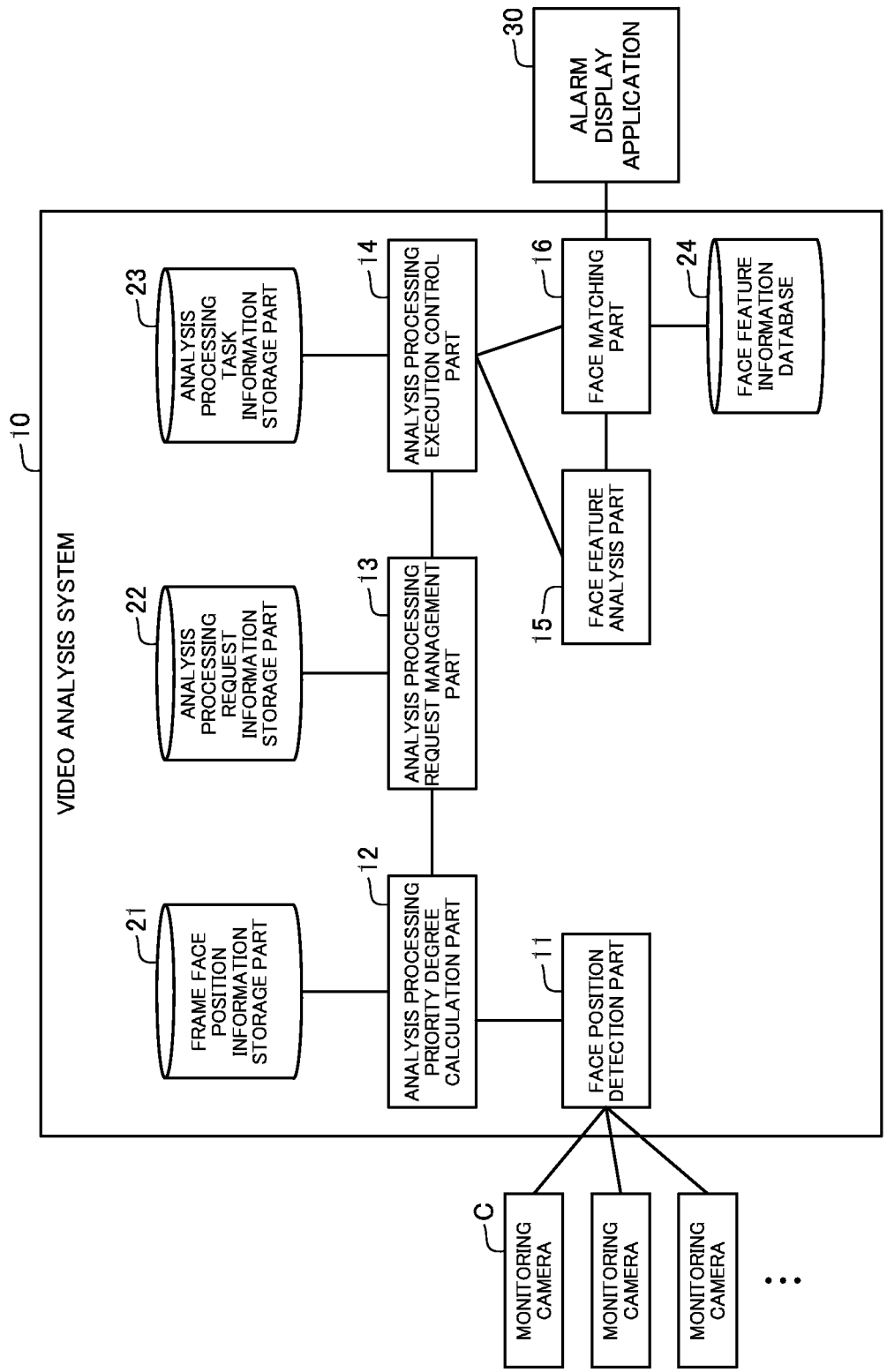
FIG. 1 is a block diagram showing the configuration of a video analysis system in a first exemplary embodiment of the present invention.
Figure 16:
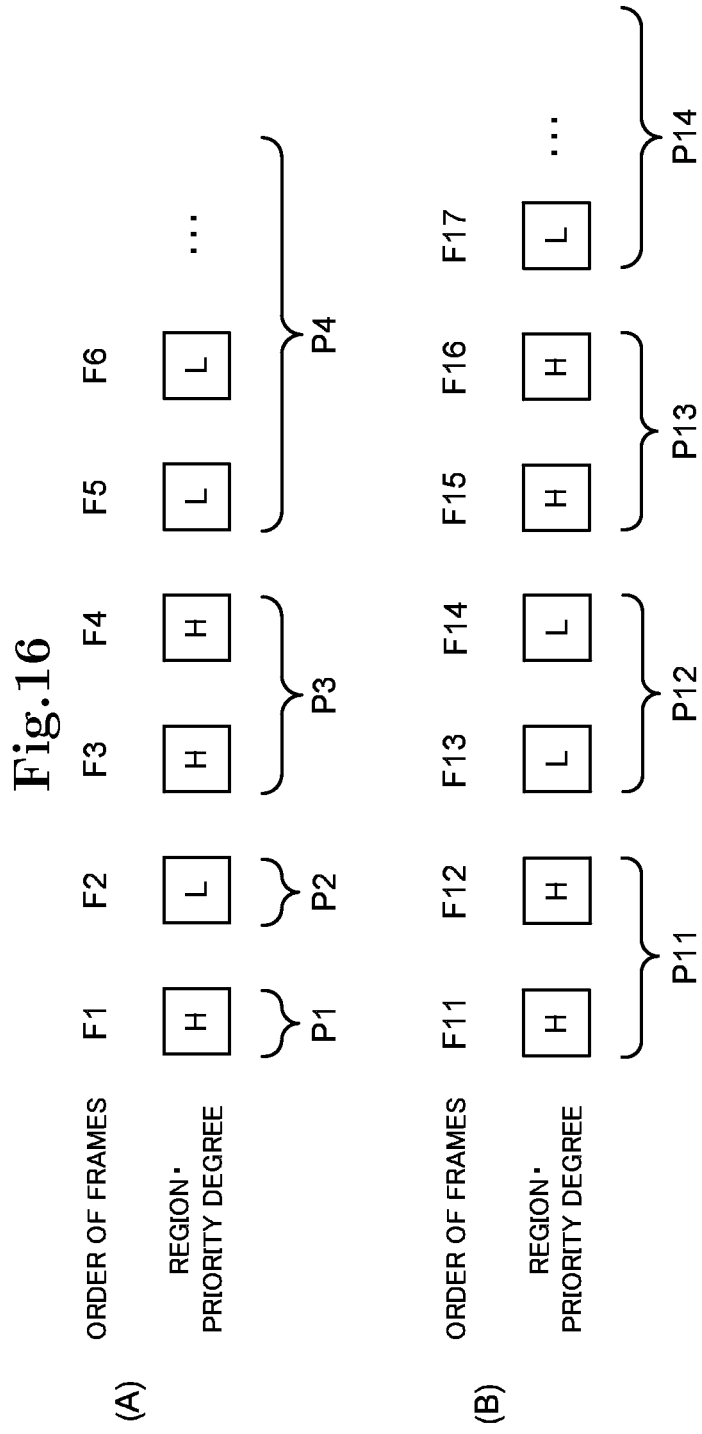
FIG. 16 is a view showing an example of image processing by the video analysis system disclosed in FIG. 1.

A first exemplary embodiment of the present invention will be described referring to FIGS. 1 to 20. FIG. 1 is a diagram showing the configuration of a video analysis system, and FIGS. 2 to 16 are views showing data stored in the video analysis system and the way of analysis processing. FIGS. 17 to 20 are views showing the operation of the video analysis system.

A video analysis system 10 (an analysis processing system) in this exemplary embodiment, which is configured by one information processing device or a plurality of information processing devices, is an analysis processing device which executes predetermined analysis processing on an image. To be specific, the video analysis system 10 executes processing of detecting a previously registered person in an image taken with a monitoring camera C and notifying it to an alarm display application 30. Meanwhile, the video analysis system 10 is an example of an analysis processing system of the present invention. The video analysis system 10 is not limited to executing analysis processing to be described below necessarily, and may execute other analysis processing. Moreover, the video analysis system 10 is not limited to including an analysis engine (an analysis processing unit) which executes analysis processing necessarily, and may be connected to an analysis engine configured by another information processing device.

An example of the configuration of the video analysis system 10 is shown in FIG. 1. First, as shown in FIG. 1, a plurality of monitoring cameras C mentioned above are connected to the video analysis system 10. For example, the monitoring cameras C are installed in different places with each other inside a building to be monitored. Each of the monitoring cameras C captures a video image (an image) of a space such as a room inside the building, and transmits the video image to the analysis system 10.

Moreover, the abovementioned alarm display application 30 is connected to the video analysis system 10. For example, the alarm display application 30 is installed in an information processing terminal of a person who monitors the inside of the building. As described later, in order to let the monitoring person know information notified from the video analysis system 10, the alarm display application 30 displays the information on the screen of the information processing terminal, or outputs the information with sound, light, or the like.

Further, the video analysis system 10 includes a face position detection part 11, an analysis processing priority degree calculation part 12, an analysis processing request management part 13, an analysis processing execution control part 14, a face feature analysis part 15, and a face matching part 16, which are constructed by installation of a program into an arithmetic device installed in the video analysis system 10. Moreover, the video analysis system 10 includes a frame face position information storage part 21, an analysis processing request information storage part 22, an analysis processing task information storage part 23 and a face feature information database 24 in a storage device installed in the video analysis system 10. Below, the respective components and the operation thereof will be described in detail.

The face position detection part 11 (an object detection unit) acquires a video image captured by each of the monitoring cameras C and transmitted from each of the monitoring cameras C (arrow Y1 in FIG. 17, step S1 in FIG. 19) and, for each frame of the acquired video image, detects the face of a person seen in the frame. To be specific, the face position detection part 11 acquires frames composing a video image at predetermined sampling periods, and detects the face of a person from each of the frames. For example, the face position detection part 11 detects the position of the face of a person seen in a frame on the basis of information (information of color and shape) representing the features of the faces of persons set in advance.

Now an example in which the face of a person is detected in a frame acquired from each of the monitoring cameras C is shown in FIG. 2. The upper view in FIG. 2 shows a state that the face of a person is detected in a frame acquired from the monitoring camera C to which a camera ID "001" is assigned in advance. The lower view in FIG. 2 shows a state that the face of a person is detected in a frame acquired at almost the same time and date from the monitoring camera C to which a camera ID "002" is assigned in advance. In the example shown in FIG. 2, the faces of persons denoted by symbols P11, P12 and P13 are detected in the frame acquired from the monitoring camera C with camera ID "001," and the faces of persons denoted by symbols P21 and P22 are detected from the frame acquired from the monitoring camera C with camera ID "002."

Figure 19:
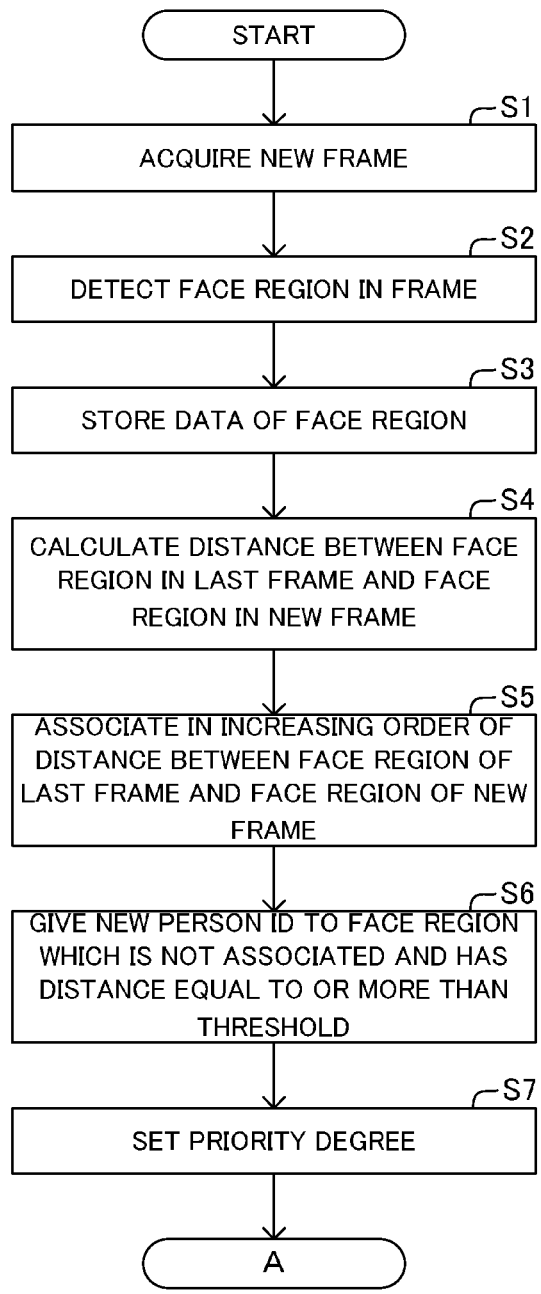
FIG. 19 is a flowchart showing the operation of the video analysis system disclosed in FIG. 1.

Then, the face position detection part 11 sets an image region of a range including the detected face of the person with reference to the position of the face, as a person region (an object region) in the frame (step S2 in FIG. 19). To be specific, the face position detection part 11 sets, as a person region, a rectangular range surrounding the whole region detected as the face of a person. Otherwise, the face position detection part 11 sets, as a person region, a preset range about the center of gravity of a position detected as the face of a person.

Now an example in which the abovementioned person region is set in an acquired frame is shown in FIG. 3. The upper view in FIG. 3 shows a state that a person region is set in a frame acquired from the monitoring camera C with camera ID "001." The lower view in FIG. 3 shows a state that a person region is set in a frame acquired from the monitoring camera C with camera ID "002." In the example shown in FIG. 3, person regions A11, A12 and A13 corresponding to the faces of the persons denoted by symbols P11, P12 and P13 are set in the frame acquired from the monitoring camera C with camera ID "001," and person regions A21 and A22 corresponding to the faces of the persons denoted by symbols P21 and P22 are set in the frame acquired from the monitoring camera C with camera ID "002."

Although an example of the method for detecting the face of a person and an example of the method for setting a person region with the face position detection part 11 are described above, these methods are not limited to the methods described above, other methods may be used. Further, a case of detecting the face of a person is shown above as an example, but it is also possible to detect another preset object instead of the face of a person and set a region of the object (an object region).

Figure 17:
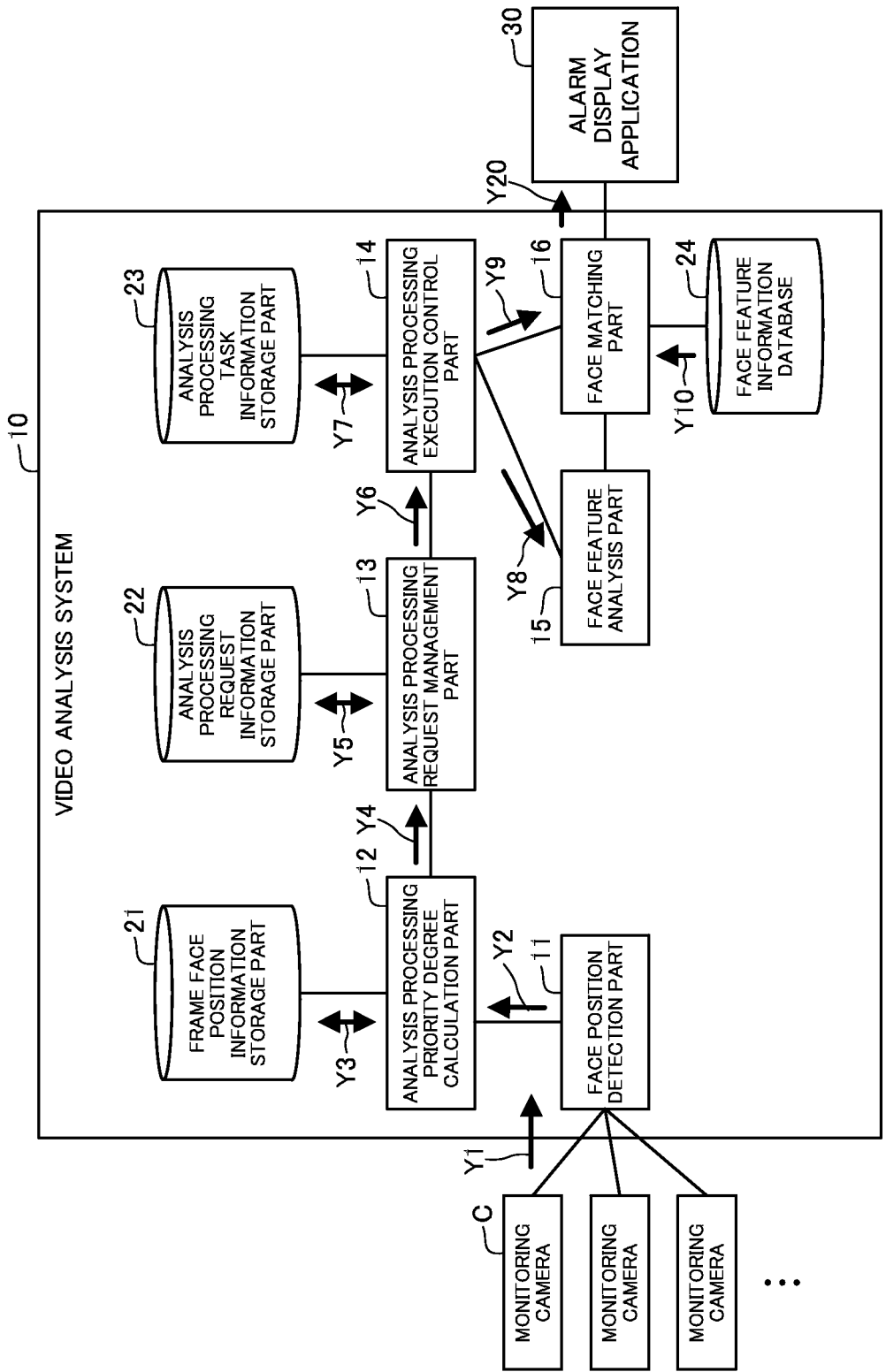
FIG. 17 is a diagram showing the operation of the video analysis system disclosed in FIG. 1.

Then, the face position detection part 11 transmits information of the person region set for each frame of the video image captured by each of the monitoring cameras C to the analysis processing degree priority calculation part 12 (arrow Y2 in FIG. 17). In this transmission, the face position detection part 11 transmits, as analysis target data the camera ID for specifying the monitoring camera C having captured the frame, time and date information of time when the frame has been captured, image information of the whole frame and information for specifying the range of the person region to the analysis processing priority degree calculation part 12. When acquiring frames from the respective monitoring cameras C, the face position detection part 11 sequentially specifies a person region in the abovementioned manner and transmits information on the person region to the analysis processing priority degree calculation part 12.

The analysis processing priority degree calculation part 12 (an object region information storage processing unit, a new object region specification unit) receives the analysis target data transmitted by the face position detection part 11 and specifies, as a new object region, a person region (an object region) including a newly appearing person (object) when compared with a past frame (for example, a last frame) captured by the same monitoring camera C.

To be specific, first, the analysis processing priority degree calculation part 12 receives the analysis target data transmitted by the face position detection part 11, and stores the analysis target data into the frame face position information storage part 21 (arrow Y3 in FIG. 17, step S3 in FIG. 19). Analysis target data to be stored includes, in addition to image information the whole image, at least the camera ID of the monitoring camera C having captured a frame, information for specifying the range of a person region, and time and date information of time when the frame has been captured as shown in FIG. 4. The analysis processing priority degree calculation part 12, every time receiving analysis target data from the face position detection part 11, stores the analysis target data into the frame face position information storage part 21.

Next, when newly receiving analysis target data, the analysis processing priority degree calculation part 12 retrieves analysis target data on a past frame captured by the same monitoring camera C as the monitoring camera C having captured a frame corresponding to the received analysis target data, from the frame face position information storage part 21 (arrow Y3 in FIG. 17). For example, the analysis processing priority degree calculation part 12 retrieves analysis target data of a last frame captured by the same monitoring camera C on the basis of a camera ID and time and date information included in new analysis target data.

Now a case where the analysis processing priority degree calculation part 12 newly receives analysis target data of a frame captured by the monitoring camera C with camera ID "001" as shown in FIG. 5B and retrieves analysis target data of a frame last captured by the same monitoring camera C with camera ID "001" as shown in FIG. 5A from the frame face position information storage part 21 will be considered, for example. In the new frame shown in FIG. 5B, person regions A41, A42, A43 and A44 corresponding to the faces of persons are set. In the last frame (old frame) shown in FIG. 5A, person regions A31, A32 and A33 corresponding to the faces of persons are set.

Next, the analysis processing priority degree calculation part 12 associates the person regions A41 to A44 in the new frame with the person regions A31 to A33 in the last frame. For example, the analysis processing priority degree calculation part 12 associates each of the person regions A41 to A44 in the new frame with any of the person regions A31 to A33 in the last frame, which is closest in distance to the person region in the new frame.

To be specific, association processing by the analysis processing priority degree calculation part 12 will be described referring to FIGS. 6A and 6B. FIG. 6A shows a state that the person regions (shown with solid lines) in the new frame captured by the monitoring camera C (FIG. 5B) are overlapped with the person regions (shown with dotted lines) in the last frame captured by the same monitoring camera C (FIG. 5A). FIG. 6B shows the way of processing of associating the respective person regions.

First, as shown in FIG. 6B, the analysis processing priority degree calculation part 12 examines the distance from the upper left corner of a rectangle, which is one vertex of one of the person regions (shown with solid lines) in the new frame, to the upper left corner of a rectangle, which is one vertex of one of the person regions (shown with dotted lines) in the last frame (step S4 in FIG. 19), and associates the person regions that are the closest in distance with each other (step S5 in FIG. 19). After that, the analysis processing priority degree calculation part 12 examines the distance between the other person regions and associates the person regions that are the closest in distance with each other, thereby repeatedly executing the processing (repeatedly executes steps S4 and S5 in FIG. 19). In this case, the person region A31 in the last frame and the person region A41 in the new frame are associated, the person regions A32 and A42 are associated, and the person regions A33 and A43 are associated. Then, the person region A44 in the new frame is associated with no person region in the last frame.

Subsequently, the analysis processing priority degree calculation part 12 examines the distance from the person region A44 in the new frame associated with no person region as mentioned above to each of all the person regions A31, A32 and A33 in the last frame. Then, in a case where the distances from the person region A44 in the new frame associated with no person region to the person regions A31 and so on in the last frame are equal to or more than a preset value, the analysis processing priority degree calculation part 12 specifies the person region A44 associated with no person region as a "new object region" (step S6 in FIG. 19). Herein, a new object region is an object region including a person newly appearing in a new frame when compared with a last frame.

On the other hand, the analysis processing priority degree calculation part 12 specifies the person regions A41, A42 and A43 associated with the person regions in the last frame as "new object following regions." A new object following region is a person region which includes the same person as a person newly appearing in a past frame and seems to follow a person region specified as a new object region in the past.

Meanwhile, the analysis processing priority degree calculation part 12 may specify the person region A44 associated with no person region as a new object region, without examining the distance from the person region A44 to each of all the person regions A31, A32 and A33 in the last frame. Further, instead of associating person regions with each other beginning with person regions that are the closest in distance, the analysis processing priority degree calculation part 12 may associate person regions that are closer in distance than a preset distance with each other, and specify a person region associated with no person region as a new object region.

A method by which the analysis processing priority degree calculation part 12 specifies a new object region is not limited to the abovementioned method. For example, the analysis processing priority degree calculation part 12 may use the distance between the centers of gravity of person regions as the distance between the person regions calculated for association of the person regions, or may associate person regions on the basis of another criterion. Further, instead of using the distance between person regions, the analysis processing priority degree calculation part 12 may compare the areas of person regions in a new frame with the areas of person regions in a last frame to associate person regions with each other beginning with person regions between which the difference of the areas is the smallest or associate person regions between which the difference of the areas is equal to or smaller than a given value.

Further, as a method for specifying a new object region in a new frame, using a frame immediately before the new frame is described above, but an older frame may be used instead of the frame immediately before the new frame. For example, the analysis processing priority degree calculation part 12 may associate a person region in a new frame with a person region in one frame or a plurality of frames within a preset time period in the past, thereby specifying a new object region in the new frame. Further, the method is not limited to specifying a new object region by using a new frame and a past frame necessarily.

Then, the analysis processing priority degree calculation part 12 newly provides a person region specified as a "new object region" with a person judgment ID, which is identification information for identifying the person region (step S6 in FIG. 19). On the other hand, the analysis processing priority degree calculation part 12 provides a person region specified as a "new object following region" with a person judgment ID already given to an associated person region in a last frame. In the example shown in FIG. 6B, as new object following regions, the person regions A41, A42 and A43 are provided with person judgment IDs set for the associated person regions A31, A32 and A33 in the last frame, respectively. Moreover, as a new object region, the person region A44 is provided with a new person judgment ID.

Furthermore, the analysis processing priority degree calculation part 12 sets a priority degree representing the degree of priority of execution of analysis processing for each person region, and associates the priority degree with a person judgment ID described above (step S7 in FIG. 19). For a person region specified as a new object region, the analysis processing priority degree calculation part 12 sets a priority degree of a larger value than for the other person region. For example, the priority degree of a person region specified as a new object region is set to a value larger than 0, whereas the priority degree of the other person region is set to 0. Consequently, the value of the priority degree of a person region specified as a new object region is set to be higher than the value of the priority degree of the other person region. Because the other person region is a new object following region, the analysis processing priority degree calculation part 12 sets the priority degree of a new object following region to 0, which is a lower value than the priority degree set for a new object region.

After that, the analysis processing priority degree calculation part 12 adds a task ID, a person judgment ID, a priority degree, time and date information of time when the frame has been captured, and so on, to image information of a person region, and transmits it as a task of executing analysis processing to the analysis processing request management part 13 (arrow Y4 in FIG. 17). Then, the analysis processing request management part 13 stores the accepted task that is information of the person region into the analysis processing request information storage part 22 (arrow Y5 in FIG. 17).

Now an example of a task that is transmitted from the analysis processing priority degree calculation part 12 to the analysis processing request management part 13 and stored into the analysis processing request information storage part 22 will be described referring to FIG. 7. As shown in FIG. 7, information stored in the analysis processing request information storage part 22 is identified with a "task ID" given to each person region detected by the face position detection part 11 and each task ID, namely, each person is associated with frame time, a priority degree, a person judgment ID and analysis data. For example, FIG. 7 shows information of the respective person regions A41, A42, A43 and A44 detected as shown in FIG. 6B. To be specific, task IDs 000001, 000002 and 000003 are information on the person regions A41, A42 and A43, respectively, and a task ID 000004 is information on the person region A44. Because the person regions A41, A42 and A43 corresponding to the task IDs 000001, 000002 and 000003 are new object following regions as described above, the priority degrees of these regions are set to a low priority degree 0.00. On the other hand, because the person region corresponding to the task ID 000004 is a new object region as described above, the priority degree of this region is set to a high priority degree 0.10 (see a shaded portion in FIG. 7).

Then, the analysis processing request management part 13 requests the analysis processing execution control part 14 to execute analysis processing in decreasing order of priority degrees on the tasks stored in the analysis processing request information storage part 22 (arrow Y6 in FIG. 17). In the example shown in FIG. 7, the analysis processing request management part 13 first requests analysis processing on a task identified with the task ID 000004 (see the shaded portion in FIG. 7), and thereafter requests analysis processing on the other tasks. The analysis processing request management part 13 notifies information in which analysis data and a priority degree are associated with a task ID to the analysis processing execution control part 14, and requests analysis processing.

The analysis processing execution control part 14 stores analysis processing requests accepted from the analysis processing request management part 13 into the analysis processing task information storage part 23, and controls to execute analysis processing in order of acceptance of the analysis processing requests. For example, as shown in FIG. 8, the analysis processing execution control part 14 assigns analysis engines which execute analysis processing to the respective tasks, and stores the tasks into the analysis processing task information storage part 23 in order of acceptance, namely, in decreasing order of priority degrees. In the example shown in FIG. 8, a face feature analysis engine or the like as an analysis engine is assigned to the task identified with the task ID 000004 having a high priority degree, and the task is stored (see a shaded portion in FIG. 8).

In this exemplary embodiment, analysis processing that execution thereof is controlled by the analysis processing execution control part 14 includes: feature extraction processing by the face feature analysis part 15, which is extracting the feature of the face of a person seen in a person region executed; and matching processing by the face matching part 16, which is matching the extracted feature of the face of the person with a previously registered feature and specifying the person executed. A previously registered feature is the feature of the face of a person who is wanted to be found through analysis, and a previously generated feature is stored in the face feature information database 24. In the present invention, however, analysis processing that execution thereof is controlled by the analysis processing execution control part 14 is not limited to the analysis processing mentioned above.

Then, the analysis processing execution control part 14 controls so that a task having a high priority degree, namely, analysis processing on a new person region is executed prior to analysis processing on the other person regions as shown in FIG. 8. In other words, the analysis processing execution control part 14 controls the analysis processing by the face feature analysis part 15 and the face matching part 16 so that the feature extraction processing and the matching processing are executed on the image information of the person regions in decreasing order of set priority degrees (arrows Y8, Y9 and Y10 in FIG. 17, step S11 in FIG. 20). Consequently, because analysis processing on a new object region with a high priority degree set is speedily executed, it is possible to quickly obtain the result of matching of a person newly appearing in a new frame. After that, analysis processing on the person regions with low priority degrees set is also executed sequentially.

Figure 20:
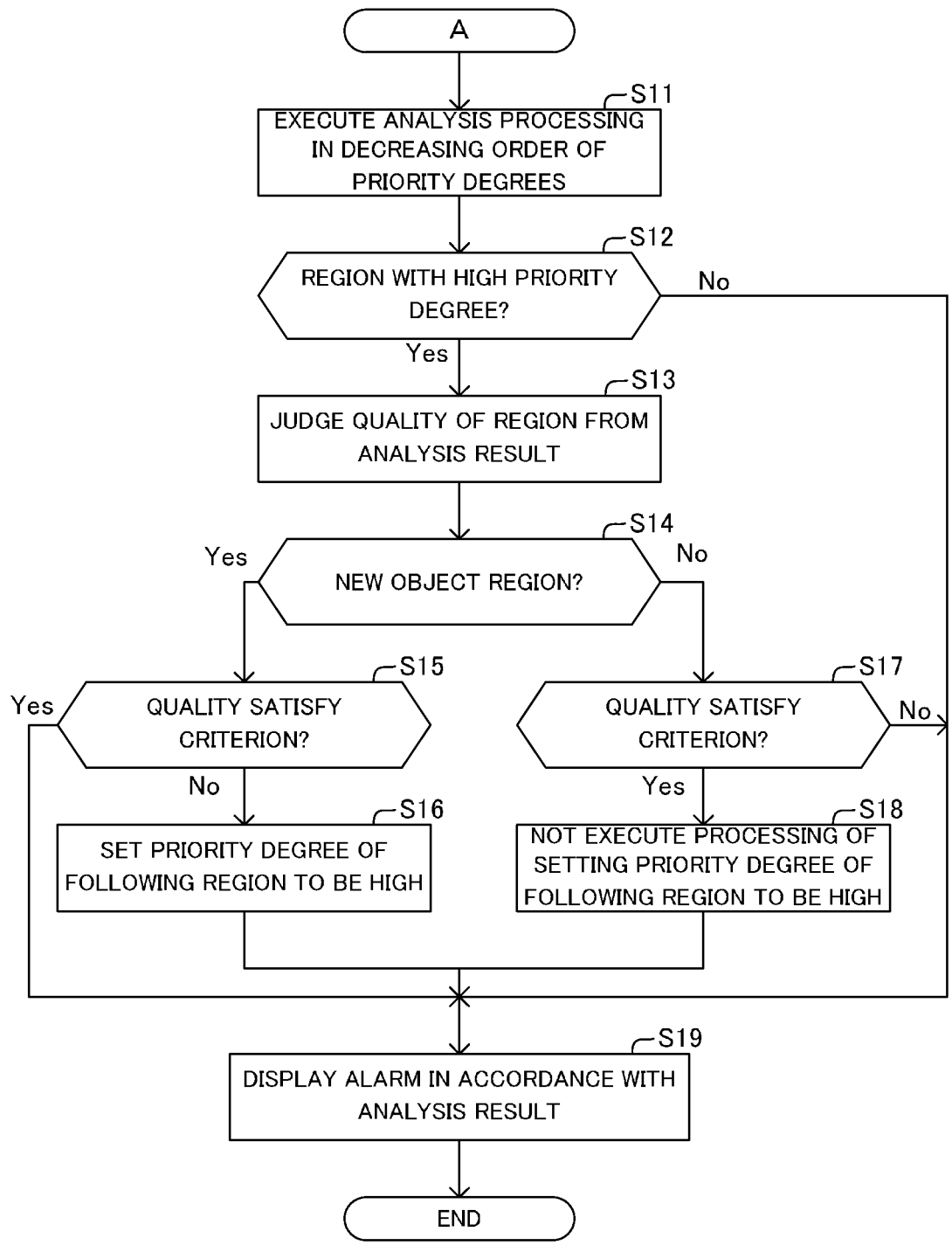
FIG. 20 is a flowchart showing the operation of the video analysis system disclosed in FIG. 1.

Then, the analysis processing execution control part 14 notifies a final analysis result to the alarm display application 30 (arrow Y20 in FIG. 17, step S19 in FIG. 20). In a case where a person registered in the face feature information database is detected through the matching processing, the analysis processing execution control part 14 notifies information on a captured video image such as time and date information of time when the frame has been captured, a camera ID of the monitoring camera C and coordinates within the frame, together with information of the person.

Meanwhile, the analysis processing priority degree calculation part 12 described above may not set the value of the priority degree of a person region specified as a new object region but associate information representing that the person region is a new object region with the person region. With this, the analysis processing request management part 13 may request the analysis processing execution control part 14 to execute analysis processing on the person region associated with the information that the person region is a new object region, prior to analysis processing on the other person regions.

Figure 18:
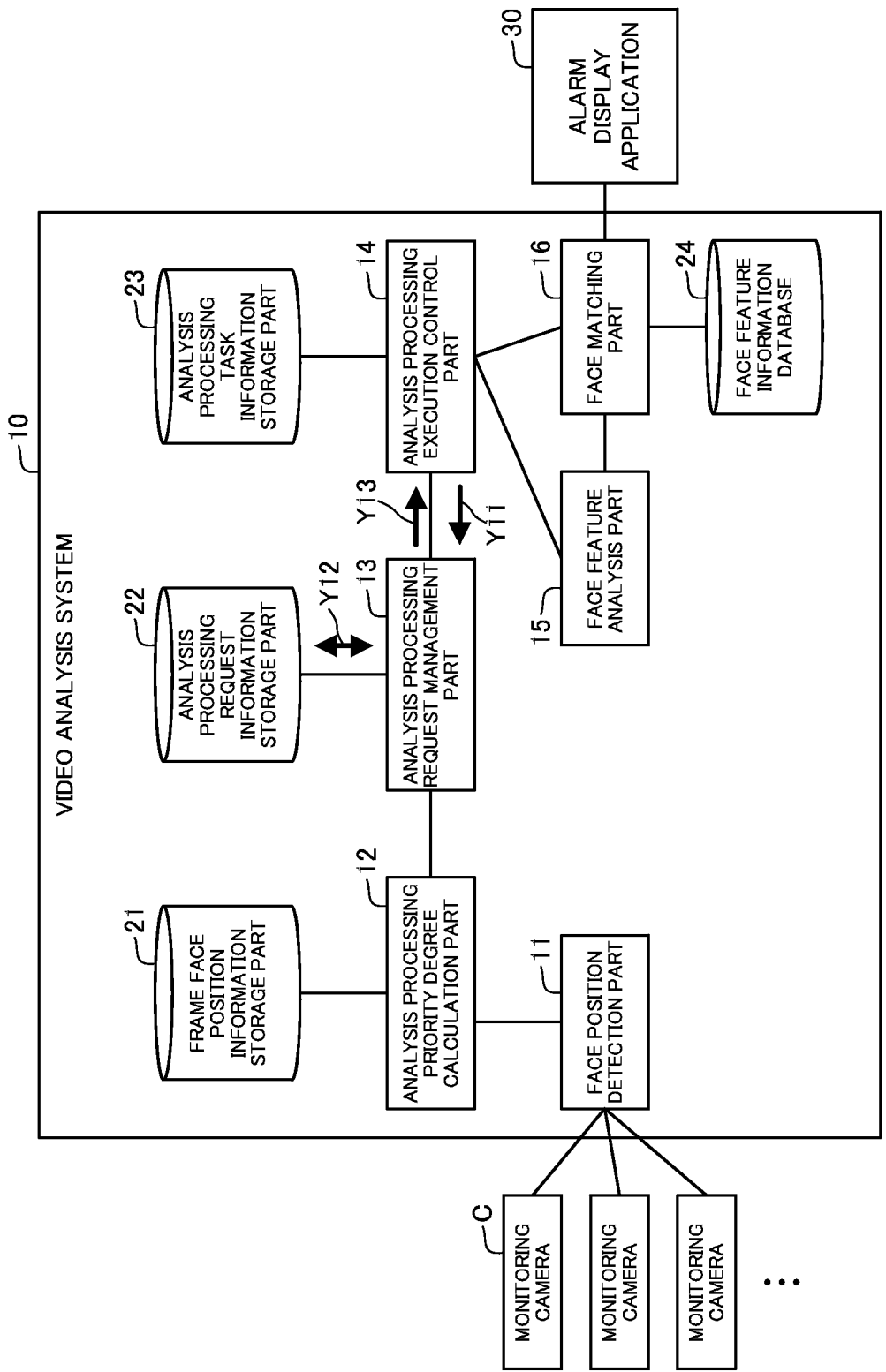
FIG. 18 is a diagram showing the operation of the video analysis system disclosed in FIG. 1.

Further, in a case where a person region subjected to analysis processing by an analysis engine is provided with a high priority degree, that is, in a case where the person region is a new object region in the above example (Yes at step S12 in FIG. 20), the analysis processing execution control part 14 (a quality judgment unit) judges whether or not an image in the new object region satisfies a quality according to a preset criterion (step S13 in FIG. 20), and notifies the result of the quality judgment to the analysis processing request management part 13 (arrow Y11 in FIG. 18). To be specific, in a case where a desired feature cannot be extracted through the feature extraction processing on the new object region executed by the face feature analysis part 15 (for example, a necessary number of feature points cannot be extracted), the analysis processing execution control part 14 judges that the quality of the new object region does not satisfy the preset criterion, and notifies it to the analysis processing request management part 13 (Yes at step S14, No at step S15 in FIG. 20).

Further, as described later, regarding a region which is a new object following region but is provided with a high priority degree and preferentially subjected to analysis processing, the analysis processing execution control part 14 also judges the quality of the new object following region (Yes at step S12, step S13, No at step S14, step S17 in FIG. 20). Then, in a case where the quality satisfies the criterion (for example, a necessary number of characteristic points can be extracted by the face feature analysis part 15), the analysis processing execution control part 14 notifies it to the analysis processing request management part 13 (Yes at step S17 in FIG. 20).

The abovementioned judgment of the quality of a person region which is a new object region or a new object following region may be performed by another method. For example, in a case where it is judged that a face seen in a new object region does not face the front on the basis of a feature extracted by the face feature analysis part 15, the analysis processing execution control part 14 may judge that the quality does not satisfy a set criterion. Use of the quality judgment result will be described later.

While analysis processing is executed and judgment of the quality of a new object region is performed, a video image captured by the monitoring camera C is also acquired. Therefore, as described above, the face position detection part 11 and the analysis processing priority degree calculation part 12 subsequently perform detection of the face of a person and setting of a person region in a newly acquired frame, and the analysis processing priority degree calculation part 12 stores information of the person region into the frame face position information storage part 21. Then, the analysis processing priority degree calculation part 12 specifies, as a new object region, a person region (an object region) including a person (an object) newly appearing in a past frame (for example, a last frame) captured by the same monitoring camera C in the same manner as described above.

Now a case where the analysis processing priority degree calculation part 12 acquires, as a frame following the frame shown in FIG. 6A, a new frame in which person regions A51, A52, A53 and A54 are set as shown in FIG. 9A will be described as an example. In a last frame (a past frame) which is immediately before the new frame, the person regions A41, A42, A43 and A44 shown with dotted lines in FIG. 9A are set (see the portions indicated with the solid lines in the frame shown in FIG. 6A). Then, the analysis processing priority degree calculation part 12 associates the person regions A51 to A54 in the new frame with the person regions A41 to A44 in the last frame as shown in FIG. 9B. As a consequence, because all the person regions A41 to A44 in the last frame and all the person regions A51 to A54 in the new frame are associated, respectively, the analysis processing priority degree calculation part 12 determines that there is no new object region. On the other hand, a following region corresponding to a person region specified as a new object region in a last frame, for example, the person region A54 following the person region A44 described above is specified as a new object following region.

Then, the analysis processing priority degree calculation part 12 provides a person region specified as a "new object following region" with a person judgment ID already given to a person region associated therewith in a last frame. In FIG. 9B, as new object following regions, the person regions A51, A52, A53 and A54 are provided with the same person judgment IDs as those set for the person regions A41, A42, A43 and A44 associated therewith in the last frame.

Moreover, the analysis processing priority degree calculation part 12 sets a priority degree representing the degree of priority of execution of analysis processing for each person region, and associates the priority degree with the person judgment ID described above. In this example, all the person regions are new object following regions, and therefore, the analysis processing priority degree calculation part 12 sets the priority degrees of the new object following regions to 0.00 so as to be lower than a priority degree set for a new object region.

After that, the analysis processing priority degree calculation part 12 adds a task ID, a person judgment ID, a priority degree, time information of time when the frame has been capture and so on to image information of the person region, and transmits the information to the analysis processing request management part 13. Then, the analysis processing request management part 13 stores the accepted information of the person region into the analysis processing request information storage part 22.

Now an example of information transmitted from the analysis processing priority degree calculation part 12 to the analysis processing request management part 13 and stored into the analysis processing request information storage part 22 will be described referring to FIG. 10. As shown in FIG. 10, a low priority degree 0.00 is set for task IDs 000011, 000012, 000013 and 000014 corresponding to the person regions A51, A52, A53 and A54. The low priority degree is also set for the task ID 000014 corresponding to a person judgment ID 10004 set to a high priority degree in the last frame (see a shaded portion in FIG. 10).

Then, the analysis processing request management part 13 requests the analysis processing execution control part 14 to execute analysis processing in decreasing order of priority degrees on tasks stored in the analysis processing request information storage part 22. In this example, the analysis processing request management part 13 sequentially requests analysis processing of tasks, whereby the tasks are stored into the analysis processing task information storage part 23 as shown in FIG. 11 and analysis processing is executed. Because a low priority degree is set for the task ID 000014 corresponding to the person judgment ID 10004 set to a high priority degree in the last frame, analysis processing on the task is not executed preferentially (see a shaded portion in FIG. 11).

Next, a case where, in the same manner as described above, the analysis processing priority degree calculation part 12 further acquires, as a frame following the frame shown in FIG. 9A described above, a new frame in which person regions A61, A62, A63 and A64 are set as shown in FIG. 12A will be described. In a last frame (a past frame) which is immediately before the new frame, the person regions A51, A52, A53 and A54 indicated with dotted lines in FIG. 12A are set (see the portions indicated with the solid lines in FIG. 9A). Then, the analysis processing priority degree calculation part 12 specifies all the person regions A61 to A64 in the new frame as "new object following regions" as shown in FIG. 12B.

Then, the analysis processing priority degree calculation part 12 sets, for the person regions A61 to A64 specified as "new object following regions," the person judgment IDs already given to the person regions associated therewith in the last frame. In FIG. 12B, the same person judgment IDs as those set for the person regions A51, A52, A53 and A54 associated therewith in the last frame are set for the person regions A61, A62, A63 and A64 as new object following regions.

Moreover, the analysis processing priority degree calculation part 12 sets a priority degree representing the degree of priority of execution of analysis processing for each person region, and associates the priority degree with the person judgment ID described above. In this example, all the person regions are new object following regions, and therefore, the analysis processing priority degree calculation part 12 sets the priority degrees of the new object following regions to 0.00 so as to be lower than a priority degree set for a new object region.

After that, the analysis processing priority degree calculation part 12 adds a task ID, a person judgment ID, a priority degree, time information of time when the frame has been captured and so on to image information of the person region, and transmits the information to the analysis processing request management part 13. Then, the analysis processing request management part 13 stores the accepted information of the person region into the analysis processing request information storage part 22.

Now an example of information transmitted from the analysis processing priority degree calculation part 12 to the analysis processing request management part 13 and stored into the analysis processing request information storage part 22 will be described referring to FIG. 13. As shown in FIG. 13, a low priority degree 0.00 is set for task IDs 000021, 000022, 000023 and 000024 corresponding to the person regions A61, A62, A63 and A64. The low priority degree is also set for the task ID 000024 corresponding to the person judgment ID 10004 set to a high priority degree in the past frame (see a shaded portion in FIG. 13).

In accordance with a quality judgment result of a person region notified from the analysis processing execution control part 14 as mentioned above (arrow Y11 in FIG. 18), the analysis processing request management part 13 (a priority degree setting unit) executes processing of setting a priority degree of a task stored in the analysis processing request information storage part 22 (arrow Y12 in FIG. 18). In the above example, the quality of a new object region (A44) in which a person identified with the person judgment ID 10004 is seen does not satisfy a criterion, so that the analysis processing request management part 13 sets the priority degree of a new object following region (the person region A64) which follows the new object region and shows the same person, to a higher priority degree than that of the other person region. In other words, as shown in the task ID 000024 in FIG. 14 (see a shaded portion), the analysis processing request management part 13 sets the priority degree to a high priority degree 0.10. This is because, although a high priority degree is given to execution of analysis processing on a person region where a person identified with the person judgment ID 10004 appears for the first time (a new object region), the quality is not a desired one and an analysis result with a desired accuracy cannot be obtained, and therefore, analysis processing on a following person region is caused to be preferentially executed so that a desired analysis result can be obtained. Meanwhile, the analysis processing request management part 13 keeps setting low priority degrees for person regions in which persons identified with other person judgment IDs are seen.

Then, the analysis processing request management part 13 requests the analysis processing execution control part 14 to execute analysis processing in decreasing order of priority degrees on tasks stored in the analysis processing request information storage part 22 (arrow Y13 in FIG. 18). In this example, the analysis processing request management part 13 sequentially requests analysis processing of tasks, whereby the tasks are stored into the analysis processing task information storage part 23 as shown in FIG. 15 and analysis processing is executed. Because a high priority degree is set for the task ID 000024 corresponding to the person judgment ID 10004 set to a low priority degree in the last frame, analysis processing on the task is preferentially executed (see a shaded portion in FIG. 15).

Further, in a case where a person region subjected to analysis processing by an analysis engine has a high priority degree (Yes at step S12 in FIG. 20), the analysis processing execution control part 14 judges whether or not an image of the person region satisfies a desired quality (step S13 in FIG. 20). In the above example, the analysis processing execution control part 14 judges the quality of the new object following region 64 identified with the task ID 000024 corresponding to the person judgment ID 10004, on the basis of the result of analysis processing (No at step S14 in FIG. 20, step S17). To be specific, in a case where a desired feature can be extracted through the feature extraction processing on the new object following region A64 executed by the face feature analysis part 15 (for example, in a case where a necessary number of feature points can be extracted), the analysis processing execution control part 14 judges that the quality of the new object following region A64 satisfies a preset criterion, and notifies it to the analysis processing request management part 13 (Yes at step S17 in FIG. 20).

Then, as described above, upon acceptance of the notification that the quality of the new object following region A64 satisfies the criterion, the analysis processing request management part 13 stops processing of setting a high priority degree for a following person region in which the person identified with the person judgment ID 000024 appearing in the new object following region A64 appears.

In other words, regarding the new object following region in which the person identified with the person judgment ID 10004 appears, until acceptance of the notification that the quality satisfies the quality criterion from the analysis processing execution control part 14, the analysis processing request management part 13 sets a high priority degree for a following new object following region and, after acceptance of the notification that the quality satisfies the quality criterion, the analysis processing request management part 13 does not set a high priority degree for a subsequent new object following region. This is because, regarding the person identified with the person judgment ID 10004, an analysis processing result with a desired accuracy is obtained, and it is thought that there is no need to preferentially execute analysis processing after that.

Now change of the priority degree of the person region where the person identified with the person judgment ID 10004 is detected will be described referring to FIG. 16A. First, as shown in FIG. 16A, a new object region F1 (an interval P1), which is a person region where a person appears for the first time in a new frame, is provided with a high priority degree H and is preferentially subjected to analysis processing. Quality judgment on the new object region F1 is also performed. Although a person region specified as the new object region F1 is for only one frame, that is, there is only one person region specified as the new object region F1 in the above description, there may be a plurality of person regions specified as the new object region F1. In other words, as shown with symbols F11 and F12 of an interval P11 in FIG. 16B, a plurality of person regions from a person region where a person appears for the first time to person regions where the same person appears in following frames may be specified as new object regions.

Until acceptance of notification that the quality of the new object region F1 does not satisfy a criterion, a following new object following region F2 (an interval P2) where the same person appears shown in FIG. 16A is provided with a low priority degree L. Therefore, as shown in an interval P12 in FIG. 16B, there may be a plurality of new object following regions F13 and F14 provided with the low priority degree L.

On the other hand, as shown in FIG. 16A, a new object following region F3 (an interval P3) after acceptance of the notification that the quality of the new object region F1 does not satisfy the criterion is provided with the high priority degree H. Consequently, analysis processing on the new object following region F3 is preferentially executed, and quality judgment on the new object following region F3 is also performed.

After that, until acceptance of notification that the quality of the new object following region F3 satisfies the criterion, a further following new object following region F4 (the interval P3) shown in FIG. 16A is provided with the high priority degree H. Therefore, as shown in an interval P13 in FIG. 16B, there may be three or more new object following regions F15, F16 provided with the high priority degree H, or there may be one new object following region.

On the other hand, as shown in FIG. 16A, a new object following region F5 after acceptance of the notification that the quality of the new object following region F3 satisfies the criterion is provided with the low priority degree L. Then, further following new object following regions F6 . . . are provided with the low priority degree L.

Thus, according to the analysis system in this exemplary embodiment, in a case where the face of a person newly appears in a new frame, analysis processing on a person region which is a region of the face of the person is preferentially executed. Therefore, it is possible to quickly execute analysis processing such as detection of a newly appearing person. Then, a subsequent image of the face of the newly appearing person is preferentially subjected to analysis processing in a case where the quality of the initial person region preferentially processed does not satisfy a set criterion. Therefore, until a desired analysis result is obtained, it is possible to execute analysis processing of the person with high speeds, and it is possible to quickly detect the person.

Although judgment of the quality of a person region (a new object region, a new object following region) is performed by using the result of analysis by the analysis engine in the above description, judgment of the quality of a person region may be performed by another method. For example, the quality may be judged from the area of the face of a person appearing in a person region, or a processing part for judging the quality based on a preset criterion may be provided additionally.

Second Exemplary Embodiment

Figure 21:
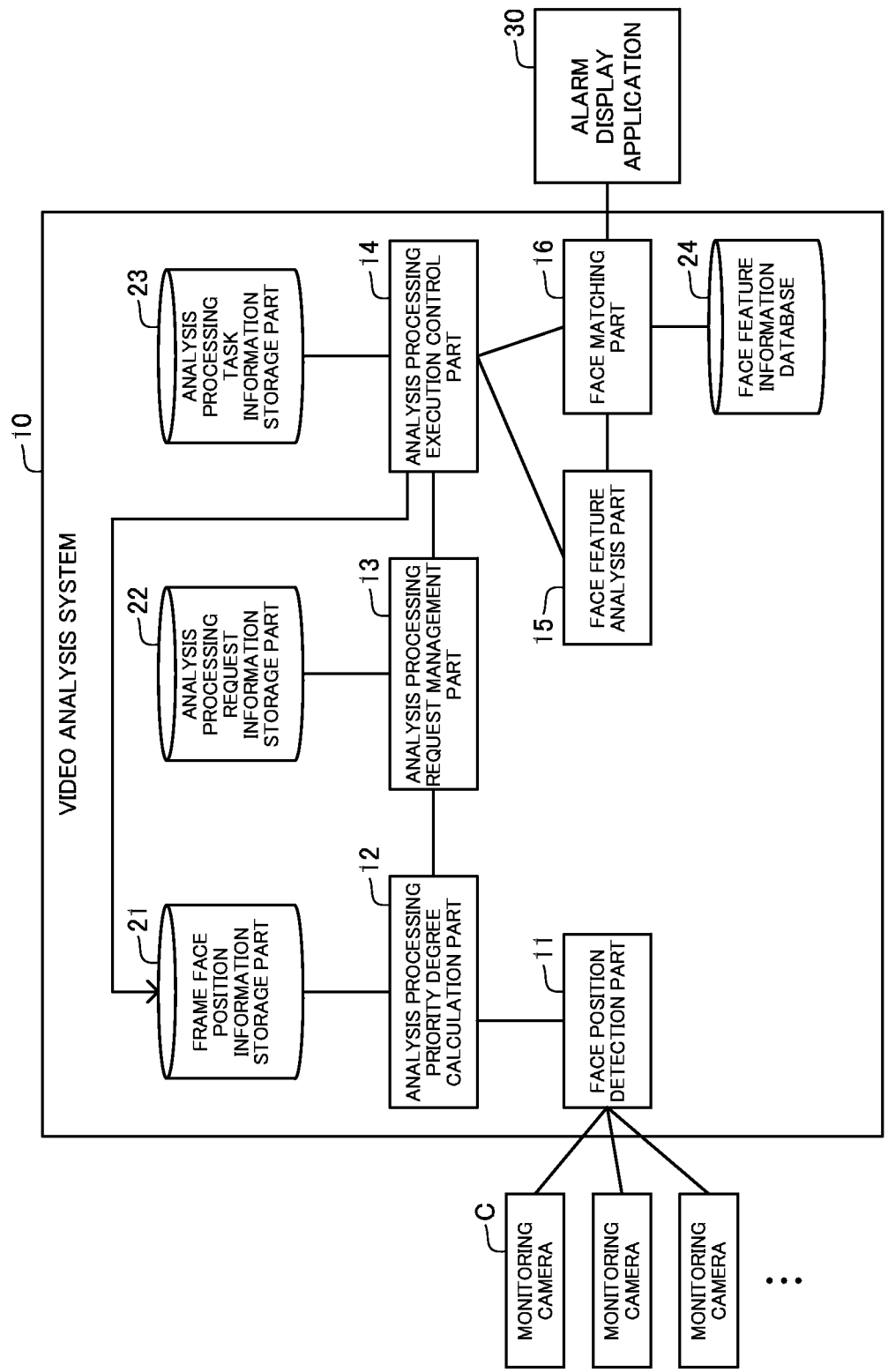
FIG. 21 is a block diagram showing the configuration of a video analysis system in a second exemplary embodiment of the present invention.
Figure 22:
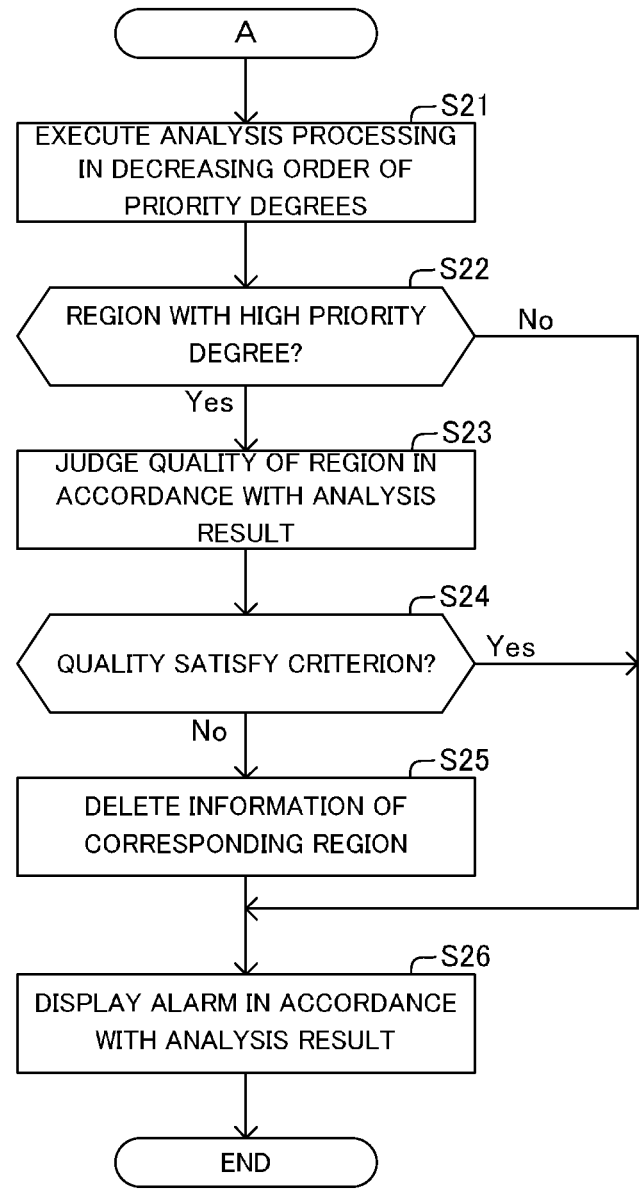
FIG. 22 is a flowchart showing the operation of the video analysis system disclosed in FIG. 21.
Figure 23:
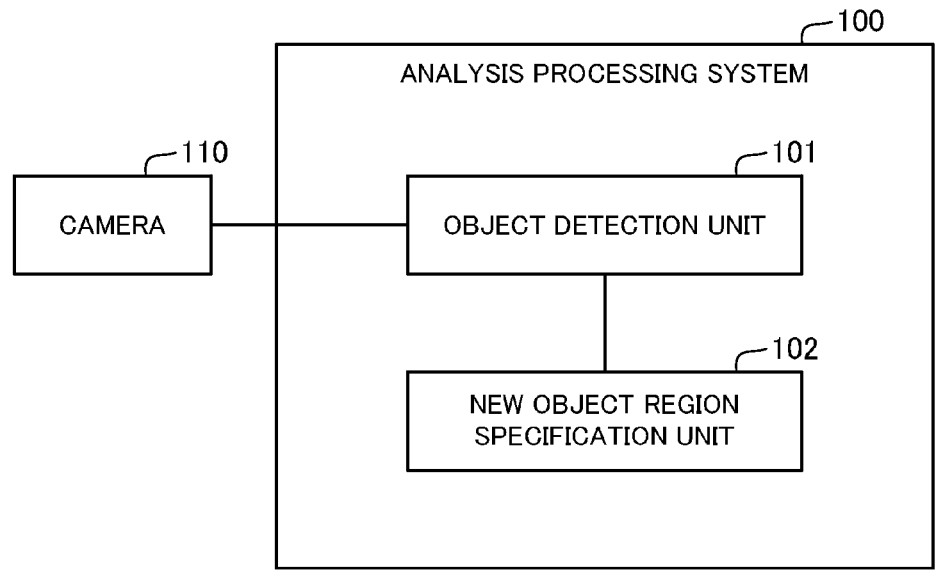
FIG. 23 is a block diagram showing the configuration of an analysis processing system in Supplementary Note 1 of the present invention.
Figure 24:
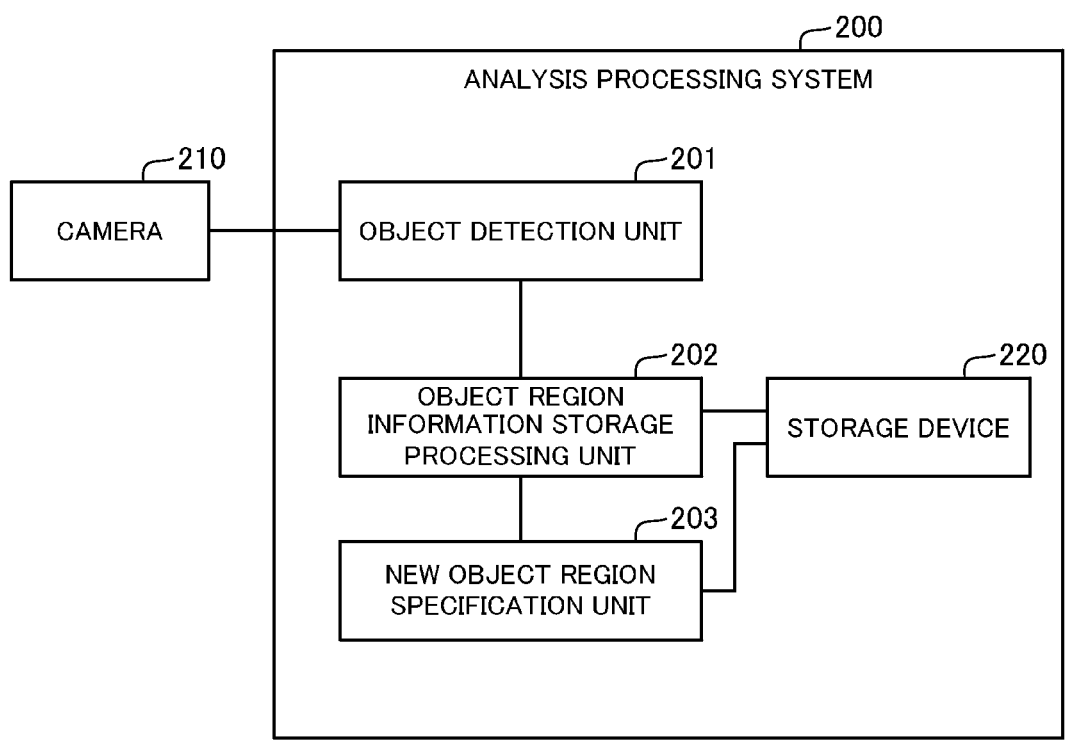
FIG. 24 is a block diagram showing the configuration of an analysis processing system in Supplementary Note 12 of the present invention.
Figure 25:
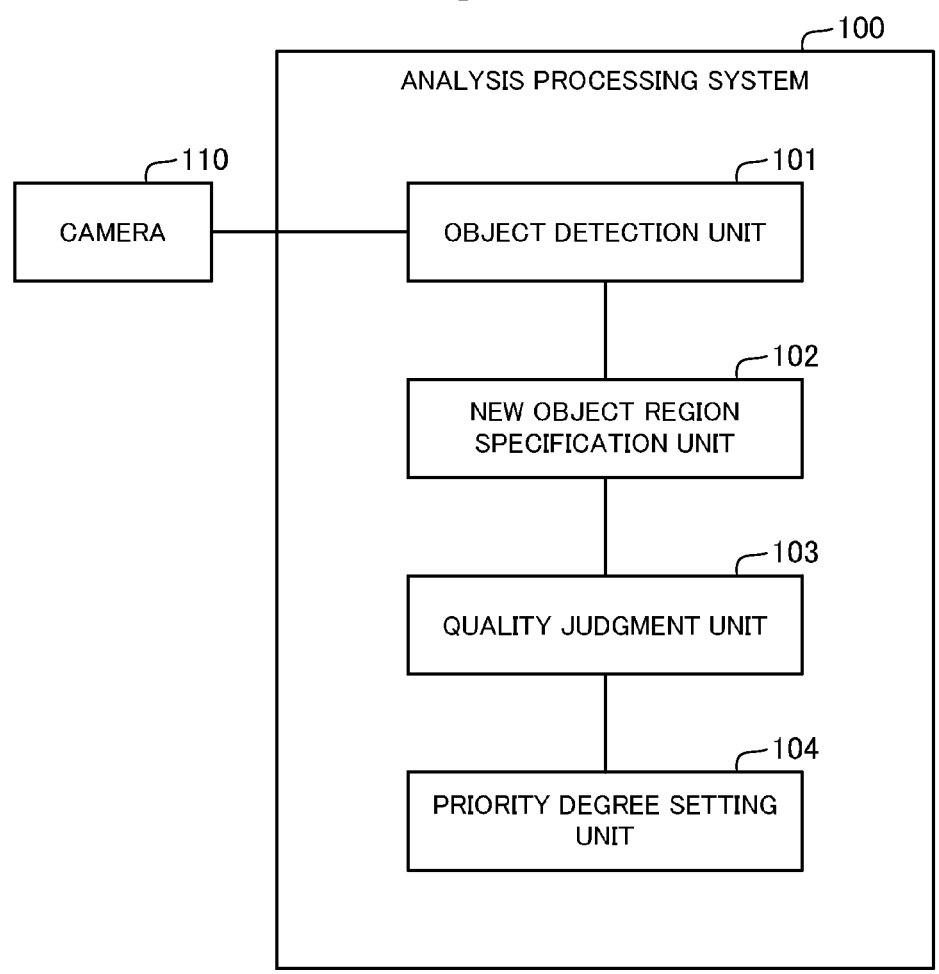
FIG. 25 is a block diagram showing the configuration of an analysis processing system in Supplementary Note 21 of the present invention.

A second exemplary embodiment of the present invention will be described referring to FIGS. 21 and 22. FIG. 21 is a diagram showing the configuration of a video analysis system, and FIG. 22 is a view showing the operation of the video analysis system.

A video analysis system 10 in this exemplary embodiment has almost the same configuration as in the first exemplary embodiment described above, but is different in processing of setting the priority degree of a person region. A different configuration and operation from in the exemplary embodiment described above will be mainly described below.

The analysis processing execution control part 14 (a quality judgment unit, an object region information deletion unit) in this exemplary embodiment deletes past information on a person region whose priority degree is set high in the video analysis system 10 in accordance with the result of quality judgment based on the result of analysis processing of the person region. Consequently, a person appearing in a deleted person region is judged as a newly appearing person in a subsequent frame, so that a priority degree thereof is set high. Thus, the analysis processing execution control part 14 has a function (a priority degree setting unit) which brings the same effect as the processing of setting a high priority degree for a new object following region by the analysis processing request management part 13 described above.

To be specific, the video analysis system 10 in this exemplary embodiment first sets a person region in a new frame and stores information of the person region into the frame face position information storage part 21. Then, the video analysis system 10, on the basis of stored information of a past person region and the information of the person region in the new frame, specifies the person region in the new frame as a new object region, and sets a high priority degree for the new object region (see the flowchart of FIG. 19).

Subsequently, the video analysis system 10 in this exemplary embodiment causes the analysis processing execution control part 14 to preferentially execute analysis processing on the new object region for which a high priority degree is set (step S21, Yes at step S22 in FIG. 22). Further, the analysis processing execution control part 14 judges the quality of the new object region from the result of analysis on the new object region (step S23 in FIG. 22). When judging that the quality of the new object region satisfies a preset criterion (Yes at step S24 in FIG. 22), the analysis processing execution control part 14 displays an alarm in accordance with the result of analysis on the new object region (step S26 in FIG. 22).

On the other hand, when judging that the quality of the new object region does not satisfy the preset criterion (No at step S24 in FIG. 22), the analysis processing execution control part 14 deletes the information of the person region specified as the new object region from the frame face position information storage part 21 (S25 in FIG. 22). Then, in a case where the same person as the person appearing in the new object region appears in a subsequent new frame, a person region of the same person in the new frame is specified as a new object region again because the information of the person region in the past frame where the same person appears is not stored. Consequently, when information of a person region of a preset quality is not obtained, the priority degree of the person region is set high, so that analysis processing on the person region is preferentially executed, and it is possible to quickly obtain a desired analysis result.

Also in the above case, judgment of the quality of a new object region does not need to use the result of analysis by the analysis engine necessarily, and judgment of the quality of a person region may be performed by another method.

<Supplementary Notes>

The whole or part of the exemplary embodiments disclosed above can be described as the following supplementary notes. Below, the overview of the configurations of an analysis processing system (see FIGS. 23 to 26), computer program and analysis processing method according to the present invention will be described. However, the present invention is not limited to the following configurations.

(Supplementary Note 1: See FIG. 23)

An analysis processing system 100 comprising:

an object detection unit 101 which acquires an image taken with a camera 110, detects an object having a preset feature in the acquired image, and sets a predetermined range as an object region, the predetermined range being a range with reference to a position where the object is detected in the image; and a new object region specification unit 102 which, on a basis of information of the object region, specifies the object region including an object newly appearing in a newly acquired image as a new object region, and sets a priority degree representing a degree of priority of execution of predetermined analysis processing on the new object region so as to be higher than the priority degree of the other object region.

(Supplementary Note 2)

The analysis processing system according to Supplementary Note 1, comprising: a quality judgment unit which, on a basis of information of the new object region, judges a quality of the new object region based on a preset criterion; and a priority degree setting unit which sets the priority degree of a new object following region so as to be higher than the priority degree of the other object region on a basis of the quality of the new object region judged by the quality judgment unit, the new object following region being in an image following the image including the new object region, and the new object following region being the object region in which a same object as the object appearing in the new object region appears.

(Supplementary Note 3)

The analysis processing system according to Supplementary Note 2, wherein in a case where the quality of the new object region judged by the quality judgment unit does not satisfy the preset criterion, the priority degree setting unit sets the priority degree of the new object following region so as to be higher than the priority degree of the other object region.

(Supplementary Note 4)

The analysis processing system according to Supplementary Note 3, wherein:

the new object region specification unit sets the priority degree of the new object following region in a newly acquired image so as to be lower than the priority degree set for the new object region; and in a case where the quality of the new object region judged by the quality judgment unit does not satisfy the preset criterion, the priority degree setting unit sets the priority degree of the new object following region so as to be higher than the priority degree of the other object region.

(Supplementary Note 5)

The analysis processing system according to Supplementary Note 4, wherein:

on a basis of information of the new object following region whose priority degree is set so as to be higher than the priority degree of the other object region, the quality judgment unit judges a quality of the new object following region based on a preset criterion; and in a case where the quality of the new object following region judged by the quality judgment unit satisfies the preset criterion, the priority degree setting unit does not execute processing to set the priority degree of the new object following region included in an image further following the image including the new object following region so as to be higher than the priority degree of the other object region.

(Supplementary Note 6)

The analysis processing system according to any one of Supplementary Notes 2 to 5, wherein the quality judgment unit judges a quality of the object region on a basis of a result of analysis processing by an analysis processing unit which executes preset analysis processing on the object region.

(Supplementary Note 7)

The analysis processing system according to any one of Supplementary Notes 2 to 5, comprising an analysis processing unit which executes preset analysis processing on the object region in decreasing order of the priority degree set for the object region, wherein the quality judgment unit judges a quality of the object region on a basis of a result of analysis processing on the object region by the analysis processing unit.

(Supplementary Note 8)

The analysis processing system according to Supplementary Note 6 or 7, wherein:

the analysis processing unit executes feature extraction processing which is extracting a preset feature in the object region; and the quality judgment unit judges a quality of the object region on a basis of a result of extraction of the feature by the analysis processing unit.

(Supplementary Note 9)

The analysis processing system according to any one of Supplementary Notes 1 to 8, comprising an object region information storage processing unit which stores information of the object region set by the object detection unit into a storage device, wherein on a basis of information of the object region stored in the storage device in a previously acquired image and information of the object region set by the object detection unit in a newly acquired image, the new object region specification unit specifies, as the new object region, the object region including an object newly appearing in the newly acquired image as compared with the previously acquired image.

(Supplementary Note 10)

The analysis processing system according to Supplementary Note 9, wherein the new object region specification unit associates the object region in a newly acquired image with the object region in a previously acquired image in accordance with a preset criterion and consequently specifies, as the new object region, the object region which is in the newly acquired image and is not associated with the object region in the previously acquired image.

(Supplementary Note 11)

The analysis processing system according to any one of Supplementary Notes 2 to 8, comprising an object region information storage processing unit which stores information of the object region set by the object detection unit into a storage device, wherein:

on a basis of information of the object region stored in the storage device in a previously acquired image and information of the object region set by the object detection unit in a newly acquired image, the new object region specification unit specifies, as the new object region, the object region including an object newly appearing in the newly acquired image as compared with the previously acquired image; and in a case where the quality of the new object region judged by the quality judgment unit does not satisfy the preset criterion, the priority degree setting unit deletes information of the object region specified as the new object region from the storage device.

(Supplementary Note 12: See FIG. 24)

An analysis processing system 200 comprising:

an object detection unit 201 which acquires an image taken with a camera 210, detects an object having a preset feature in the acquired image, and sets a predetermined range as an object region, the predetermined range being a range with reference to a position where the object is detected in the image;

an object region information storage processing unit 202 which stores information of the object region into a storage device 220; and a new object region specification unit 203 which, on a basis of information of the object region stored in the storage device 220 in a previously acquired image and information of the object region set by the object detection unit in a newly acquired image, specifies, as a new object region, the object region including an object newly appearing in the newly acquired image as compared with the previously acquired image, and sets a priority degree representing a degree of priority of execution of predetermined analysis processing on the new object region so as to be higher than the priority degree of the other object region.

(Supplementary Note 12-2)

The analysis processing system according to Supplementary Note 12, comprising:

a quality judgment unit which, on a basis of information of the new object region, judges a quality of the new object region based on a preset criterion; and an object region information deletion unit which, in a case where the quality of the new object region judged by the quality judgment unit does not satisfy the preset criterion, deletes information of the object region specified as the new object region from the storage device.

(Supplementary Note 13)

A computer program comprising instructions for causing an information processing device to realize:

an object detection unit which acquires an image taken with a camera, detects an object having a preset feature in the acquired image, and sets a predetermined range as an object region, the predetermined range being a range with reference to a position where the object is detected in the image; and a new object region specification unit which, on a basis of information of the object region, specifies the object region including an object newly appearing in a newly acquired image as a new object region, and sets a priority degree representing a degree of priority of execution of predetermined analysis processing on the new object region so as to be higher than the priority degree of the other object region.

(Supplementary Note 14)

The computer program according to Supplementary Note 13, further comprising instructions for causing the information processing device to realize:

a quality judgment unit which, on a basis of information of the new object region, judges a quality of the new object region based on a preset criterion; and a priority degree setting unit which sets the priority degree of a new object following region so as to be higher than the priority degree of the other object region on a basis of the quality of the new object region judged by the quality judgment unit, the new object following region being in an image following the image including the new object region, and the new object following region being the object region in which a same object as the object appearing in the new object region appears.

(Supplementary Note 15)

The computer program according to Supplementary Note 14, wherein in a case where the quality of the new object region judged by the quality judgment unit does not satisfy the preset criterion, the priority degree setting unit sets the priority degree of the new object following region so as to be higher than the priority degree of the other object region.

(Supplementary Note 15-2)

The computer program according to Supplementary Note 15, wherein:

the new object region specification unit sets the priority degree of the new object following region in a newly acquired image so as to be lower than the priority degree set for the new object region; and in a case where the quality of the new object region judged by the quality judgment unit does not satisfy the preset criterion, the priority degree setting unit sets the priority degree of the new object following region so as to be higher than the priority degree of the other object region.

(Supplementary Note 15-3)

The computer program according to Supplementary Note 15-2, wherein:

on a basis of information of the new object following region whose priority degree is set so as to be higher than the priority degree of the other object region, the quality judgment unit judges a quality of the new object following region based on a preset criterion; and in a case where the quality of the new object following region judged by the quality judgment unit satisfies the preset criterion, the priority degree setting unit does not execute processing to set the priority degree of the new object following region included in an image further following the image including the new object following region so as to be higher than the priority degree of the other object region.

(Supplementary Note 15-4)

The computer program according to any one of Supplementary Notes 14 to 15-3, wherein the quality judgment unit judges a quality of the object region on a basis of a result of analysis processing by an analysis processing unit which executes preset analysis processing on the object region.

(Supplementary Note 15-5)

The computer program according to any one of Supplementary Notes 14 to 15-3, further comprising instructions for causing the information processing device to realize an analysis processing unit which executes preset analysis processing on the object region in decreasing order of the priority degree set for the object region, wherein the quality judgment unit judges a quality of the object region on a basis of a result of analysis processing on the object region by the analysis processing unit.

(Supplementary Note 15-6)

The computer program according to Supplementary Note 15-4 or 15-5 wherein:

the analysis processing unit executes feature extraction processing which is extracting a preset feature in the object region; and the quality judgment unit judges a quality of the object region on a basis of a result of extraction of the feature by the analysis processing unit.

(Supplementary Note 15-7)

The computer program according to any one of Supplementary Notes 13 to 15-6, further comprising instructions for causing the information processing device to realize an object region information storage processing unit which stores information of the object region set by the object detection unit into a storage device, wherein on a basis of information of the object region stored in the storage device in a previously acquired image and information of the object region set by the object detection unit in a newly acquired image, the new object region specification unit specifies, as the new object region, the object region including an object newly appearing in the newly acquired image as compared with the previously acquired image.

(Supplementary Note 15-8)

The computer program according to Supplementary Note 15-7, wherein the new object region specification unit associates the object region in a newly acquired image with the object region in a previously acquired image in accordance with a preset criterion and consequently specifies, as the new object region, the object region which is in the newly acquired image and is not associated with the object region in the previously acquired image.

(Supplementary Note 15-9)

The computer program according to any one of Supplementary Notes 14 to 15-6, further comprising instructions for causing the information processing device to realize an object region information storage processing unit which stores information of the object region set by the object detection unit into a storage device, wherein:

on a basis of information of the object region stored in the storage device in a previously acquired image and information of the object region set by the object detection unit in a newly acquired image, the new object region specification unit specifies, as the new object region, the object region including an object newly appearing in the newly acquired image as compared with the previously acquired image; and in a case where the quality of the new object region judged by the quality judgment unit does not satisfy the preset criterion, the priority degree setting unit deletes information of the object region specified as the new object region from the storage device.

(Supplementary Note 16)

A computer program comprising instructions for causing an information processing device to realize:

an object detection unit which acquires an image taken with a camera, detects an object having a preset feature in the acquired image, and sets a predetermined range as an object region, the predetermined range being a range with reference to a position where the object is detected in the image;

an object region information storage processing unit which stores information of the object region into a storage device; and a new object region specification unit which, on a basis of information of the object region stored in the storage device in a previously acquired image and information of the object region set by the object detection unit in a newly acquired image, specifies, as a new object region, the object region including an object newly appearing in the newly acquired image as compared with the previously acquired image, and sets a priority degree representing a degree of priority of execution of predetermined analysis processing on the new object region so as to be higher than the priority degree of the other object region.

(Supplementary Note 16-2)

The computer program according to Supplementary Note 16, further comprising instructions for causing the information processing device to realize:

a quality judgment unit which, on a basis of information of the new object region, judges a quality of the new object region based on a preset criterion; and an object region information deletion unit which, in a case where the quality of the new object region judged by the quality judgment unit does not satisfy the preset criterion, deletes information of the object region specified as the new object region from the storage device.

(Supplementary Note 17)

An analysis processing method comprising:

acquiring an image taken with a camera, detecting an object having a preset feature in the acquired image, and setting a predetermined range as an object region, the predetermined range being a range with reference to a position where the object is detected in the image; and on a basis of information of the object region, specifying the object region including an object newly appearing in a newly acquired image as a new object region, and setting a priority degree representing a degree of priority of execution of predetermined analysis processing on the new object region so as to be higher than the priority degree of the other object region.

(Supplementary Note 18)

The analysis processing method according to Supplementary Note 17, comprising:

on a basis of information of the new object region, judging a quality of the new object region based on a preset criterion; and setting the priority degree of a new object following region so as to be higher than the priority degree of the other object region on a basis of the judged quality of the new object region, the new object following region being in an image following the image including the new object region, and the new object following region being the object region in which a same object as the object appearing in the new object region appears.

(Supplementary Note 19)

The analysis processing method according to Supplementary Note 18, comprising, in a case where the judged quality of the new object region does not satisfy the preset criterion, setting the priority degree of the new object following region so as to be higher than the priority degree of the other object region.

Supplementary Note 19-2)

The analysis processing method according to Supplementary Note 19, comprising:

when setting the priority degree of the new object region, setting the priority degree of the new object following region in a newly acquired image so as to be lower than the priority degree set for the new object region; and in a case where the judged quality of the new object region does not satisfy the preset criterion, setting the priority degree of the new object following region so as to be higher than the priority degree of the other object region.

(Supplementary Note 19-3)

The analysis processing method according to Supplementary Note 19-2, comprising:

on a basis of information of the new object following region whose priority degree is set so as to be higher than the priority degree of the other object region, judging a quality of the new object following region based on a preset criterion; and in a case where the judged quality of the new object following region satisfies the preset criterion, not executing processing to set the priority degree of the new object following region in an image which further follows the image including the new object following region so as to be higher than the priority degree of the other object region.

(Supplementary Note 19-4)

The analysis processing method according to any one of Supplementary Notes 18 to 19-3, comprising judging a quality of the object region on a basis of a result of analysis processing by an analysis processing unit which executes preset analysis processing on the object region.

(Supplementary Note 19-5)

The analysis processing method according to any one of Supplementary Notes 18 to 19-3, comprising executing preset analysis processing on the object region in decreasing order of the priority degree set for the object region; and judging a quality of the object region on a basis of a result of analysis processing on the object region.

(Supplementary Note 19-6)

The analysis processing method according to Supplementary Note 19-4 or 19-5, comprising:

in the analysis processing, executing feature extraction processing which is extracting a preset feature in the object region; and judging a quality of the object region on a basis of a result of extraction of the feature through the feature extraction processing.

(Supplementary Note 19-7)

The analysis processing method according to any one of Supplementary Notes 17 to 19-6, comprising:

storing information of the object region set in the acquired image into a storage device; and on a basis of information of the object region stored in the storage device in a previously acquired image and information of the set object region in a newly acquired image, specifying, as the new object region, the object region including an object newly appearing in the newly acquired image as compared with the previously acquired image.

(Supplementary Note 19-8)

The analysis processing method according to Supplementary Note 19-7, comprising associating the object region in a newly acquired image with the object region in a previously acquired image in accordance with a preset criterion and consequently specifying, as the new object region, the object region which is in the newly acquired image and is not associated with the object region in the previously acquired image.

(Supplementary Note 19-9)

The analysis processing method according to any one of Supplementary Notes 18 to 19-6, comprising:

storing information of the object region set in the acquired image into a storage device;

on a basis of information of the object region stored in the storage device in a previously acquired image and information of the set object region in a newly acquired image, specifying, as the new object region, the object region including an object newly appearing in the newly acquired image as compared with the previously acquired image; and in a case where the judged quality of the new object region does not satisfy the preset criterion, deleting information of the object region specified as the new object region from the storage device.

(Supplementary Note 20)

An analysis processing method comprising:

acquiring an image taken with a camera, detecting an object having a preset feature in the acquired image, and setting a predetermined range as an object region, the predetermined range being a range with reference to a position where the object is detected in the image;

storing information of the object region into a storage device; and on a basis of information of the object region stored in the storage device in a previously acquired image and information of the set object region in a newly acquired image, specifying, as a new object region, the object region including an object newly appearing in the newly acquired image as compared with the previously acquired image, and setting a priority degree representing a degree of priority of execution of predetermined analysis processing on the new object region so as to be higher than the priority degree of the other object region.

(Supplementary Note 20-2)

The analysis processing method according to Supplementary Note 20, comprising:

on a basis of information of the new object region, judging a quality of the new object region based on a preset criterion; and in a case where the judged quality of the new object region does not satisfy the preset criterion, deleting information of the object region specified as the new object region from the storage device.

(Supplementary Note 21: See FIG. 25)

An analysis processing system 100 comprising:

an object detection unit 101 which acquires an image taken with a camera 110, detects an object having a preset feature in the acquired image, and sets a predetermined range as an object region, the predetermined range being a range with reference to a position where the object is detected in the image;

a new object region specification unit 102 which, on a basis of information of the object region, specifies the object region including an object newly appearing in a newly acquired image as a new object region, and sets a priority degree representing a degree of priority of execution of predetermined analysis processing on the new object region so as to be higher than the priority degree of the other object region;

a quality judgment unit 103 which, on a basis of information of the new object region, judges a quality of the new object region based on a preset criterion; and a priority degree setting unit 104 which sets the priority degree of a new object following region so as to be higher than the priority degree of the other object region on a basis of the quality of the new object region judged by the quality judgment unit, the new object following region being in an image following the image including the new object region, and the new object following region being the object region in which a same object as the object appearing in the new object region appears.

(Supplementary Note 22: See FIG. 26)

An analysis processing system 200 comprising:

an object detection unit 201 which acquires an image taken with a camera 210, detects an object having a preset feature in the acquired image, and sets a predetermined range as an object region, the predetermined range being a range with reference to a position where the object is detected in the image;

an object region information storage processing unit 202 which stores information of the object region into a storage device 220;

a new object region specification unit 203 which, on a basis of information of the object region stored in the storage device in a previously acquired image and information of the object region set by the object detection unit in a newly acquired image, specifies, as a new object region, the object region including an object newly appearing in the newly acquired image as compared with the previously acquired image, and sets a priority degree representing a degree of priority of execution of predetermined analysis processing on the new object region so as to be higher than the priority degree of the other object region;

a quality judgment unit 204 which, on a basis of information of the new object region, judges a quality of the new object region based on a preset criterion; and an object region information deletion unit 205 which, in a case where the quality of the new object region judged by the quality judgment unit does not satisfy the preset criterion, deletes information of the object region specified as the new object region from the storage device.

(Supplementary Note 23)

A computer program comprising instructions for causing an information processing device to realize:

an object detection unit which acquires an image taken with a camera, detects an object having a preset feature in the acquired image, and sets a predetermined range as an object region, the predetermined range being a range with reference to a position where the object is detected in the image;

a new object region specification unit which, on a basis of information of the object region, specifies the object region including an object newly appearing in a newly acquired image as a new object region, and sets a priority degree representing a degree of priority of execution of predetermined analysis processing on the new object region so as to be higher than the priority degree of the other object region;

a quality judgment unit which, on a basis of information of the new object region, judges a quality of the new object region based on a preset criterion; and a priority degree setting unit which sets the priority degree of a new object following region so as to be higher than the priority degree of the other object region on a basis of the quality of the new object region judged by the quality judgment unit, the new object following region being in an image following the image including the new object region, and the new object following region being the object region in which a same object as the object appearing in the new object region appears.

(Supplementary Note 24)

A computer program comprising instructions for causing an information processing device to realize:

an object detection unit which acquires an image taken with a camera, detects an object having a preset feature in the acquired image, and sets a predetermined range as an object region, the predetermined range being a range with reference to a position where the object is detected in the image;

an object region information storage processing unit which stores information of the object region into a storage device;

a new object region specification unit which, on a basis of information of the object region stored in the storage device in a previously acquired image and information of the object region set by the object detection unit in a newly acquired image, specifies, as a new object region, the object region including an object newly appearing in the newly acquired image as compared with the previously acquired image, and sets a priority degree representing a degree of priority of execution of predetermined analysis processing on the new object region so as to be higher than the priority degree of the other object region;

a quality judgment unit which, on a basis of information of the new object region, judges a quality of the new object region based on a preset criterion; and an object region information deletion unit which, in a case where the quality of the new object region judged by the quality judgment unit does not satisfy the preset criterion, deletes information of the object region specified as the new object region from the storage device.

(Supplementary Note 25)

An analysis processing method comprising:

acquiring an image taken with a camera, detecting an object having a preset feature in the acquired image, and setting a predetermined range as an object region, the predetermined range being a range with reference to a position where the object is detected in the image;

on a basis of information of the object region, specifying the object region including an object newly appearing in a newly acquired image as a new object region, and setting a priority degree representing a degree of priority of execution of predetermined analysis processing on the new object region so as to be higher than the priority degree of the other object region;

on a basis of information of the new object region, judging a quality of the new object region based on a preset criterion; and setting the priority degree of a new object following region so as to be higher than the priority degree of the other object region on a basis of the judged quality of the new object region, the new object following region being in an image following the image including the new object region, and the new object following region being the object region in which a same object as the object appearing in the new object region appears.

(Supplementary Note 26)

An analysis processing method comprising:

acquiring an image taken with a camera, detecting an object having a preset feature in the acquired image, and setting a predetermined range as an object region, the predetermined range being a range with reference to a position where the object is detected in the image;

storing information of the object region into a storage device;

on a basis of information of the object region stored in the storage device in a previously acquired image and information of the object region set by the object detection unit in a newly acquired image, specifying, as a new object region, the object region including an object newly appearing in the newly acquired image as compared with the previously acquired image, and setting a priority degree representing a degree of priority of execution of predetermined analysis processing on the new object region so as to be higher than the priority degree of the other object region;

on a basis of information of the new object region, judging a quality of the new object region based on a preset criterion; and in a case where the judged quality of the new object region does not satisfy the preset criterion, deleting information of the object region specified as the new object region from the storage device.

The abovementioned computer program is stored in a storage device or recorded on a computer-readable recording medium. For example, the recording medium is a portable medium such as a flexible disk, an optical disk, a magneto-optical disk and a semiconductor memory.

Although the present invention is described above referring to the exemplary embodiments and so on, the present invention is not limited to the exemplary embodiments. The configurations and details of the present invention can be changed and modified in various manners that can be understood by one skilled in the art within the scope of the present invention.

The present invention is based upon and claims the benefit of priority from Japanese patent application No. 2013-020404, filed on Feb. 5, 2013, the disclosure of which is incorporated herein in its entirety by reference.

DESCRIPTION OF NUMERALS 10 video analysis system
11 face position detection part
12 analysis processing priority degree calculation part
13 analysis processing request management part
14 analysis processing execution control part
15 face feature analysis part
16 face matching part
21 frame face position information storage part
22 analysis processing request information storage part
23 analysis processing task information storage part
24 face feature information database
30 alarm display application
C monitoring camera
100 analysis processing system
101 object detection unit
102 new object region specification unit
103 quality judgment unit
104 priority degree setting unit
110 camera
200 analysis processing system
201 object detection unit
202 object region information storage processing unit
203 new object region specification unit
204 quality judgment unit
205 object region information deletion unit
210 camera
220 storage device

The invention claimed is:

1. An analysis processing system comprising:
a memory storing instructions; and
at least one processor configured to process the instructions to:
detect a first object in a first image,
set a first object region which is a range corresponding to a position where the first object is detected in the first image,
specify a second object region which includes a second object appearing in a second image from the first object region on a basis of information of the first object region,
set a priority degree for executing of analysis processing on the second object region,
determine, on a basis of information of the second object region, a quality of the second object region based on a first criterion, and
set the priority degree of a third object region so as to be higher than the priority degree of the other object region on a basis of the quality of the second object region, the third object region being in a third image following the second image, and the third object region being the first object region in which a same object as the second object is included.

2. The analysis processing system according to claim 1, wherein the at least one processor is further configured to process the instructions to:
set the priority degree of the third object region so as to be higher than the priority degree of the other object region in response to determining not to satisfy the first criterion.

3. The analysis processing system according to claim 2, wherein the at least one processor is further configured to process the instructions to:
set the priority degree of the third object region so as to be lower than the priority degree set for the second object region, and
set the priority degree of the third object region so as to be higher than the priority degree of the other object region in response to determining not to satisfy the first criterion.

4. The analysis processing system according to claim 3, wherein the at least one processor is further configured to process the instructions to:
determine a quality of the third object region based on the first criterion, on a basis of information of the third object region whose priority degree is set so as to be higher than the priority degree of the other object region, and
do not execute processing to set the priority degree of the third object region included in a fourth image further following the third image so as to be higher than the priority degree of the other object region in response to determining to satisfy the first criterion.

5. The analysis processing system according to claim 1, wherein the at least one processor is further configured to process the instructions to:
determine the quality of the second object region on a basis of a result of the analysis processing on the second object region.

6. The analysis processing system according to claim 1, wherein the at least one processor is further configured to process the instructions to:
execute the analysis processing on the second object region in decreasing order of the priority degree set for the object region, and
determine a quality of the second object region on a basis of a result of the analysis processing on the second object region.

7. The analysis processing system according to claim 5, wherein the at least one processor is further configured to process the instructions to:

extract a preset feature in the second object region, and
determine a quality of the second object region on a basis of a result of extraction of the feature.

8. The analysis processing system according to claim 1, wherein the at least one processor is further configured to process the instructions to
store information of the first object region, and
specify the second object region as compared with the first image on a basis of the stored information of the first object region in the first image and information of the second object region.

9. The analysis processing system according to claim 8, wherein the at least one processor is further configured to process the instructions to:
associate the first object region in the second image with the first object region in the first image in accordance with a second criterion and
specify the second object region which is in the second image and is not associated with the first object region in the first image.

10. The analysis processing system according to claim 1, wherein the at least one processor is further configured to process the instructions to:
store information of the first object region into the memory,
specify the second object region as compared with the first image on a basis of the stored information of the first object region in the first image and information of the second object region, and
delete the information of the first object region specified as the second object region from the memory.

11. A non-transitory computer-readable medium storing instructions that when executed by a computer enable the computer to implement a method, the method comprising:
detecting a first object in a first image;
setting a first object region which is a range corresponding to a position where the first object is detected in the first image;
specifying a second object region which includes a second object appearing in a second image from the first object region on a basis of the first object region;
setting a priority degree for executing of analysis processing on the second object region;
determining, on a basis of information of the second object region, a quality of the second object region based on a preset first criterion; and
setting the priority degree of a third object region so as to be higher than the priority degree of the other object region on a basis of the quality of the second object region, the third object region being in a third image following the second image, and the third object region being the first object region in which a same object as the second object is included.

12. The non-transitory computer-readable medium according to claim 11, wherein the method further comprises:
setting the priority degree of the third object region so as to be higher than the priority degree of the other object region in response to determining not to satisfy the first criterion.

13. An analysis processing method comprising:
detecting a first object in a first image;
setting a first object region which is a range corresponding to a position where the first object is detected in the first image;
specifying a second object region which includes a second object appearing in a second image from the first object region on a basis of the first object region;
setting a priority degree for executing of analysis processing on the second object region;
determining, on a basis of information of the second object region, a quality of the second object region based on a first criterion; and
setting the priority degree of a third object region so as to be higher than the priority degree of the other object region on a basis of the quality of the second object region, the third object region being in a third image following the second image, and the third object region being the first object region in which a same object as the second object is included.

14. The analysis processing method according to claim 13, further comprising:
setting the priority degree of the third object region so as to be higher than the priority degree of the other object region in response to determining not to satisfy the first criterion.

15. The analysis processing system according to claim 1, wherein the at least one processor is further configured to process the instructions to:
set the priority degree for executing of the analysis processing on the second object region so as to be higher than the priority degree of the other object region.

16. The non-transitory computer-readable storage medium according to claim 11, wherein the method further comprises:
setting the priority degree for executing of the analysis processing on the second object region so as to be higher than the priority degree of the other object region.

17. The analysis processing method according to claim 13, further comprising:
setting the priority degree for executing of the analysis processing on the second object region so as to be higher than the priority degree of the other object region.

* * * * *